US007570824B2

(12) United States Patent
Katougi et al.

(10) Patent No.: US 7,570,824 B2
(45) Date of Patent: Aug. 4, 2009

(54) IMAGE PROCESSING METHOD, IMAGE PROCESSOR, IMAGE FORMING APPARATUS AND MEMORY PRODUCT

(75) Inventors: Terumitsu Katougi, Chiba (JP); Shiro Wakahara, Chiba (JP); Kazuyuki Hamada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 889 days.

(21) Appl. No.: 10/886,729

(22) Filed: Jul. 8, 2004

(65) Prior Publication Data

US 2005/0008245 A1 Jan. 13, 2005

(30) Foreign Application Priority Data

| | | |
|---|---|---|
| Jul. 11, 2003 | (JP) | 2003-273501 |
| Sep. 25, 2003 | (JP) | 2003-334272 |
| Oct. 24, 2003 | (JP) | 2003-365097 |

(51) Int. Cl.
*G06K 9/36* (2006.01)

(52) U.S. Cl. ........................ 382/239; 382/162; 382/232

(58) Field of Classification Search ................. 382/162, 382/232, 239, 254; 358/1.5, 515, 520
See application file for complete search history.

(56) References Cited

U.S. PATENT DOCUMENTS

| | | | | |
|---|---|---|---|---|
| 6,252,989 | B1 * | 6/2001 | Geisler et al. | 382/232 |
| 6,584,225 | B1 | 6/2003 | Moroney | 382/235 |

FOREIGN PATENT DOCUMENTS

| | | |
|---|---|---|
| JP | 2001-143066 | 5/2001 |
| JP | 2002-10085 | 1/2002 |
| JP | 2002-158879 | 5/2002 |

OTHER PUBLICATIONS

"Threshold Control Technique for Error Diffusion Method", Toshiaki Kakutani, Journal of the Society of Electrophotography, 1998, vol. 37, No. 2, p. 186-192.

"High Quality Image Processing for Ink Jet Printers", T. Makita, Journal of the Image Society of Japan, 2001, vol. 40, No. 3, p. 239-243.

* cited by examiner

*Primary Examiner*—Duy M Dang
(74) *Attorney, Agent, or Firm*—Renner, Otto, Boisselle & Sklar, LLP

(57) ABSTRACT

Image data is transformed into spatial frequency components, the transformed spatial frequency components are quantized, a modification process of changing spatial frequency components in a predetermined frequency domain is performed on the quantized spatial frequency components, the spatial frequency components on which the modification process is performed are inverse-quantized, the inverse-quantized spatial frequency components are inverse-transformed into image data, and the number of gray levels in the inverse-transformed image data is reduced to two levels, four levels or other levels based on threshold values. A high-quality binary image, quaternary image, etc. are generated by solving the problem of tone gap which occurs in the vicinity of output levels of the image data and solving the texture caused in dithering and worms caused in error diffusion.

37 Claims, 31 Drawing Sheets

FIG. 1A
PRIOR ART

| | | | |
|---|---|---|---|
| 0 | 8 | 2 | 10 |
| 12 | 4 | 14 | 6 |
| 3 | 11 | 1 | 9 |
| 15 | 7 | 13 | 5 |

FIG. 1B
PRIOR ART

| | | | |
|---|---|---|---|
| 0 | 128 | 32 | 160 |
| 192 | 64 | 224 | 96 |
| 48 | 176 | 16 | 144 |
| 240 | 112 | 208 | 80 |

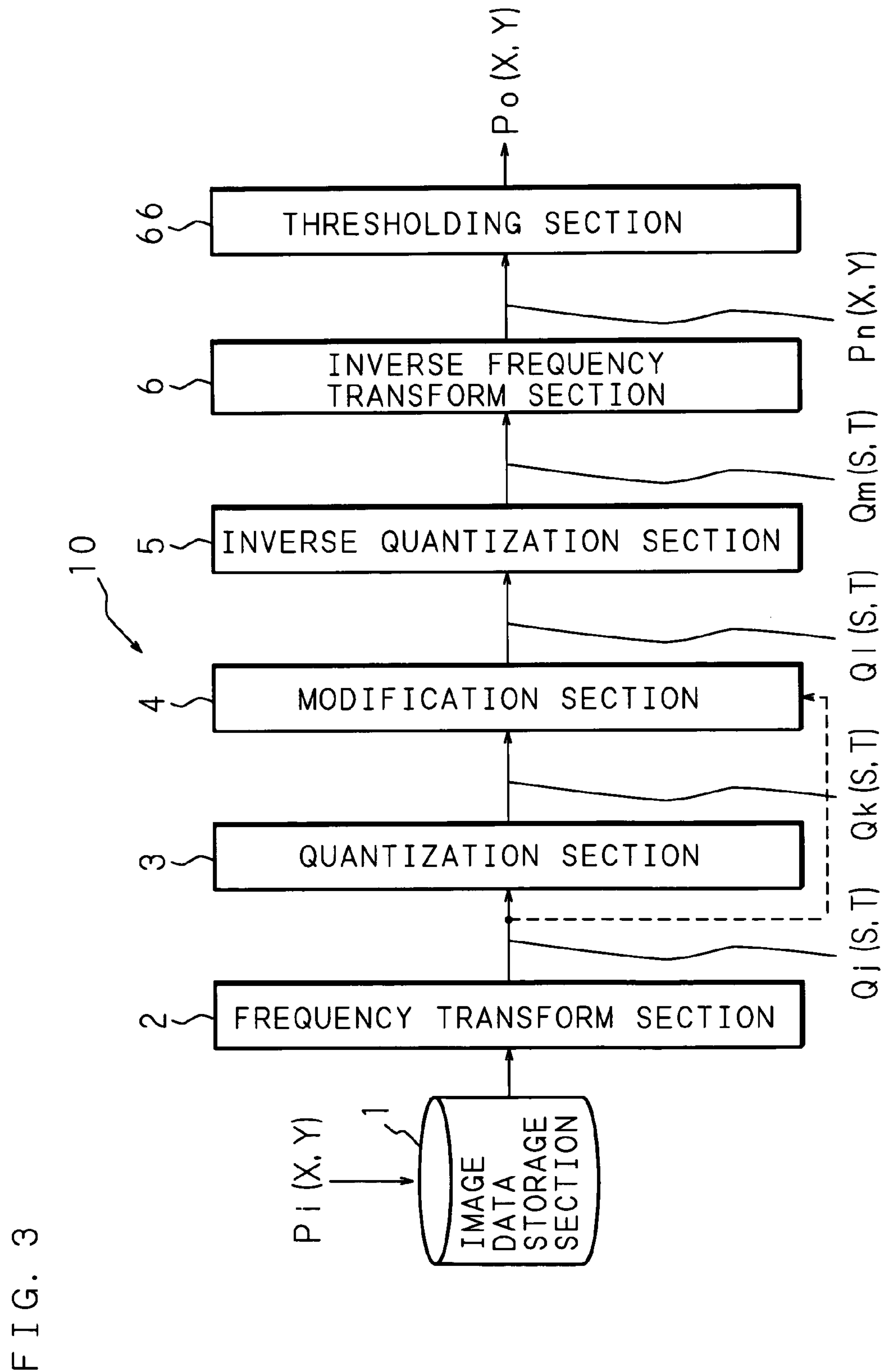
F I G. 3
P i (X, Y)
1
IMAGE DATA STORAGE SECTION
2
FREQUENCY TRANSFORM SECTION
Q j (S, T)
3
QUANTIZATION SECTION
Qk (S, T)
4
MODIFICATION SECTION
Q l (S, T)
10
5
INVERSE QUANTIZATION SECTION
Qm (S, T)
6
INVERSE FREQUENCY TRANSFORM SECTION
P n (X, Y)
66
THRESHOLDING SECTION
P o (X, Y)

| | | | | | | | |
|---|---|---|---|---|---|---|---|
| 13 | −3 | 0 | 0 | 0 | 0 | 0 | 0 |
| 3 | 2 | −1 | 0 | 0 | 0 | 0 | 0 |
| −1 | 1 | 1 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

REPLACE DCT COEFFICIENTS IN MODIFICATION REGION BY 0, 1 OR −1

| | | | | | | | |
|---|---|---|---|---|---|---|---|
| 13 | −3 | 0 | 0 | 0 | 0 | 0 | 0 |
| 3 | 2 | −1 | 0 | 0 | 0 | 0 | 0 |
| −1 | 1 | 1 | 0 | 0 | 0 | 0 | 0 |
| 0 | 0 | 0 | 0 | 1 | 0 | 0 | 0 |
| 0 | 0 | 0 | 0 | 0 | 0 | 0 | 0 |
| 0 | 0 | 0 | 0 | 0 | 0 | 0 | 1 |
| 0 | 0 | 0 | 0 | 0 | −1 | 0 | 1 |
| 0 | 0 | 0 | 0 | −1 | 0 | 0 | 0 |

11
Pi(X, Y)
1
IMAGE DATA STORAGE SECTION
2
FREQUENCY TRANSFORM SECTION
Qj(S, T)
4
MODIFICATION SECTION
Qk(S, T)
3
QUANTIZATION SECTION
Ql(S, T)
5
INVERSE QUANTIZATION SECTION
Qm(S, T)
6
INVERSE FREQUENCY TRANSFORM SECTION
Pn(X, Y)
66
THRESHOLDING SECTION
Po(X, Y)

12
Pi(X,Y)
1
IMAGE DATA STORAGE SECTION
2
FREQUENCY TRANSFORM SECTION
Qj(S,T)
3
QUANTIZATION SECTION
Qk(S,T)
7
DC COMPONENT DETERMINING SECTION
4
MODIFICATION SECTION
Ql(S,T)
5
INVERSE QUANTIZATION SECTION
Qm(S,T)
6
INVERSE FREQUENCY TRANSFORM SECTION
Pn(X,Y)
66
THRESHOLDING SECTION
Po(X,Y)

13
Pi(X, Y)
1
IMAGE DATA STORAGE SECTION
2
FREQUENCY TRANSFORM SECTION
3
QUANTIZATION SECTION
4
MODIFICATION SECTION
5
INVERSE QUANTI-ZATION SECTION
6
INVERSE FREQUENCY TRANSFORM SECTION
66
THRESHOLDING SECTION
Po(X, Y)
Qj(S, T)
Qk(S, T)
Ql(S, T)
Qm(S, T)
Pn(X, Y)
7
DC COMPONENT DETERMINING SECTION
8
LUT SECTION

| | | | | | | | |
|---|---|---|---|---|---|---|---|
| 13 | -3 | 0 | 0 | 0 | 0 | 0 | 0 |
| 3 | 2 | -1 | 0 | 0 | 0 | 0 | 0 |
| -1 | 1 | 1 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

| | | | | | | | |
|---|---|---|---|---|---|---|---|
| 13 | -3 | 0 | 0 | 0 | 0 | 0 | 0 |
| 3 | 2 | -1 | 0 | 0 | 0 | 0 | 0 |
| -1 | 1 | 1 | 0 | 0 | 0 | 0 | 0 |
| 0 | 0 | 0 | 0 | 1 | 0 | 0 | 0 |
| 0 | 0 | 0 | 0 | 0 | 0 | 0 | 0 |
| 0 | 0 | 0 | 0 | 1 | 1 | 0 | 1 |
| 0 | 1 | 0 | 0 | 1 | -1 | 1 | 1 |
| -1 | -1 | 0 | 0 | -1 | -1 | 0 | 0 |

FIG. 13C

LUT

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 1 | 0 | 0 | 0 |
| 0 | 0 | 0 | 0 | 0 | 0 | 0 | 0 |
| 0 | 0 | 0 | 0 | 1 | 1 | 0 | 1 |
| 0 | 1 | 0 | 0 | 1 | -1 | 1 | 1 |
| -1 | -1 | 0 | 0 | -1 | -1 | 0 | 0 |

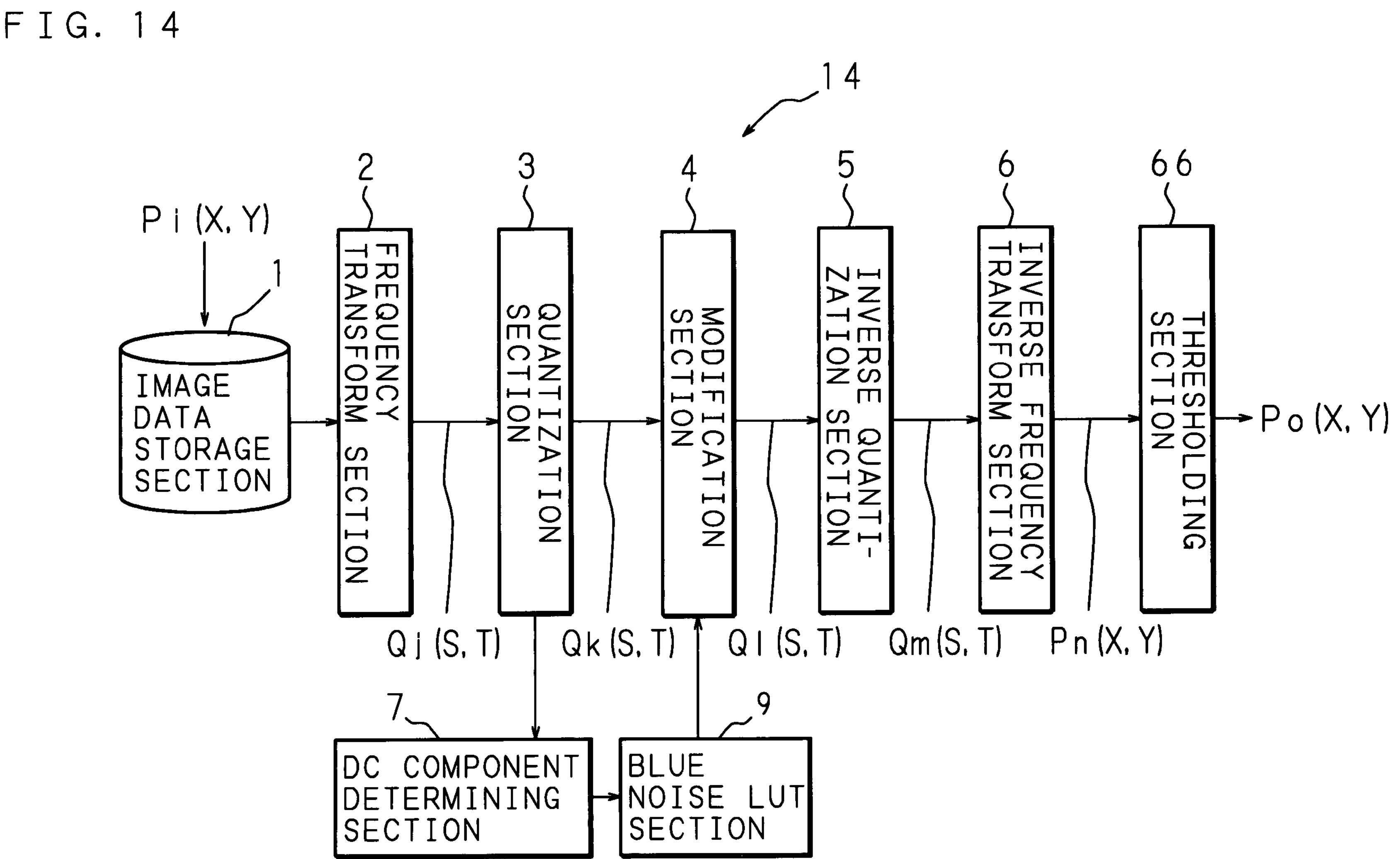
F I G. 1 4
14
Pi (X, Y)
1
IMAGE DATA STORAGE SECTION
2
FREQUENCY TRANSFORM SECTION
3
QUANTIZATION SECTION
4
MODIFICATION SECTION
5
INVERSE QUANTI-ZATION SECTION
6
INVERSE FREQUENCY TRANSFORM SECTION
66
THRESHOLDING SECTION
Po (X, Y)
Qj (S, T)
Qk (S, T)
Ql (S, T)
Qm (S, T)
Pn (X, Y)
7
DC COMPONENT DETERMINING SECTION
9
BLUE NOISE LUT SECTION

| Y \ X | 1 | 2 | 3 | 4 | 5 | 6 | 7 | 8 | 9 | 10 | |
|---|---|---|---|---|---|---|---|---|---|---|---|
| 1 | 48 | −88 | 24 | −24 | 65 | −104 | −7 | 99 | −44 | −112 | ... |
| 2 | −45 | 105 | −68 | 89 | −60 | 106 | 47 | −77 | 0 | 117 | ... |
| 3 | −108 | 14 | 59 | −97 | 11 | −17 | −122 | 27 | 66 | −103 | ... |
| 4 | 83 | −72 | −33 | 114 | 42 | −82 | 127 | −58 | −24 | 101 | ... |
| 5 | −126 | 49 | −3 | −117 | −54 | 66 | −6 | 84 | −86 | 43 | ... |
| 6 | 123 | −52 | 90 | 38 | 102 | −32 | −112 | 51 | 15 | −98 | ... |
| 7 | −84 | 22 | −98 | −18 | −87 | 19 | 109 | −58 | −16 | 73 | ... |
| 8 | 113 | −12 | 82 | 13 | −52 | 71 | −3 | −92 | 98 | −118 | ... |
| 9 | 57 | −64 | −123 | 55 | 114 | −106 | −39 | 50 | 5 | −30 | ... |
| 10 | −36 | 107 | 1 | −44 | −81 | 17 | 66 | −65 | 126 | −76 | ... |
| | ⋮ | ⋮ | ⋮ | ⋮ | ⋮ | ⋮ | ⋮ | ⋮ | ⋮ | ⋮ | |

FIG. 16A

ONE BLOCK

| B11 | B12 | B13 | B14 | B15 | B16 | B17 | B18 | B11 | B12 |
|---|---|---|---|---|---|---|---|---|---|
| B21 | B22 | B23 | B24 | B25 | B26 | B27 | B28 | B21 | B22 |
| B31 | B32 | B33 | B34 | B35 | B36 | B37 | B38 | B31 | B32 |
| B41 | B42 | B43 | B44 | B45 | B46 | B47 | B48 | B41 | B42 |
| B51 | B52 | B53 | B54 | B55 | B56 | B57 | B58 | B51 | B52 |
| B61 | B62 | B63 | B64 | B65 | B66 | B67 | B68 | B61 | B62 |
| B71 | B72 | B73 | B74 | B75 | B76 | B77 | B78 | B71 | B72 |
| B81 | B82 | B83 | B84 | B85 | B86 | B87 | B88 | B81 | B82 |
| B11 | B12 | B13 | B14 | B15 | B16 | B17 | B18 | B11 | B12 |
| B21 | B22 | B23 | B24 | B25 | B26 | B27 | B28 | B21 | B22 |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 1 | 0 | 0 | 0 |
| 0 | 0 | 0 | 0 | 0 | 0 | 0 | 0 |
| 0 | 0 | 0 | 0 | 1 | 1 | 0 | 1 |
| 0 | 1 | 0 | 0 | 1 | −1 | 1 | 1 |
| −1 | −1 | 0 | 0 | −1 | −1 | 0 | 0 |

| 0 | 0 | 0 | 0 | 0 | 0 | 0 | 1 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | −1 | 0 | 1 | −1 |
| 0 | 0 | 0 | 0 | 0 | −1 | 0 | 0 |
| 0 | 0 | 0 | 0 | 0 | 1 | 0 | 1 |
| 0 | 0 | 0 | 0 | 0 | 1 | 1 | 0 |
| 0 | 0 | 0 | 0 | 1 | 0 | 0 | −1 |

| | | | | | | | |
|---|---|---|---|---|---|---|---|
| 0.02 | 0 | −0.01 | −0.01 | −0.09 | 0.1 | 0.08 | 0.04 |
| −0.07 | −0.25 | −0.07 | −0.3 | 0.31 | −0.3 | −0.21 | 0.07 |
| 0.08 | 0.25 | 0.06 | 0.24 | −0.06 | 0.32 | 0.07 | −0.11 |
| 0.15 | −0.25 | 0.26 | −0.21 | 0.57 | −0.29 | 0.14 | 0.27 |
| 0.18 | −0.09 | 0.27 | 0.03 | 0.23 | 0.43 | 0.07 | 0.44 |
| −0.21 | −0.22 | 0.08 | −0.09 | 0.59 | 0.51 | −0.47 | 0.56 |
| 0.1 | 0.55 | −0.07 | −0.4 | 0.85 | −0.54 | 1.03 | 0.86 |
| −0.71 | −0.65 | 0.33 | −0.39 | −0.79 | −0.98 | 0.2 | −0.1 |

| | | | | | | | |
|---|---|---|---|---|---|---|---|
| −0.14 | 0.01 | −0.07 | 0.14 | −0.09 | 0.2 | −0.31 | 0.65 |
| −0.09 | 0.02 | −0.29 | 0.25 | −0.39 | 0.22 | −0.39 | −0.1 |
| −0.09 | −0.04 | 0.1 | 0.09 | 0.24 | 0.36 | 0.18 | 0.48 |
| −0.15 | −0.19 | −0.41 | −0.17 | −0.52 | 0.11 | 0.58 | −0.88 |
| −0.16 | −0.4 | 0.23 | −0.22 | 0.36 | −0.51 | 0.28 | −0.11 |
| −0.1 | 0.04 | −0.37 | 0.49 | −0.21 | 0.19 | −0.42 | 0.1 |
| −0.37 | −0.11 | −0.21 | 0.07 | 0.28 | 1 | 1.26 | 0.28 |
| −0.31 | −0.03 | −0.47 | 0.12 | 0.59 | 0.19 | −0.1 | −0.91 |

| | | | | | | | |
|---|---|---|---|---|---|---|---|
| 797.5 | 7.5 | −4.6 | 3.9 | 1 | 4.3 | −4.6 | −1.4 |
| 263.8 | −13.7 | −5.1 | 0.4 | 5.1 | 12.8 | 5 | −0.5 |
| −1.1 | −28.6 | −12.2 | 3.7 | −9 | −0.8 | −8.4 | −4.5 |
| −55.2 | −9.4 | 1.3 | −9.6 | 9.5 | 6.7 | 10.2 | −0.3 |
| 1.8 | 15.7 | 6.8 | 2.9 | −1.3 | −5.1 | −6.4 | −4.2 |
| 2 | −3.2 | 1.4 | 11.3 | −4 | 1 | −2.2 | 5.1 |
| −14.4 | −11.3 | −14.2 | −5.2 | 1.8 | −4.1 | 3 | 1.1 |
| −9.3 | −0.4 | −19.5 | −4.3 | −0.2 | −3.5 | 3.1 | 3.3 |

| | | | | | | | |
|---|---|---|---|---|---|---|---|
| 797.5 | 7.5 | −4.6 | 3.9 | 1 | 4.3 | −4.6 | 0 |
| 263.8 | −13.7 | −5.1 | 0.4 | 5.1 | 12.8 | 0 | 0 |
| −1.1 | −28.6 | −12.2 | 3.7 | −9 | 0 | 0 | 0 |
| −55.2 | −9.4 | 1.3 | −9.6 | 0 | 0 | 64 | 0 |
| 1.8 | 15.7 | 6.8 | 0 | 0 | 0 | 0 | 0 |
| 2 | −3.2 | 0 | 64 | 0 | 0 | 0 | 0 |
| −14.4 | −64 | −64 | 0 | 0 | 0 | 0 | 0 |
| 0 | 0 | −64 | 0 | 0 | 0 | 0 | 0 |

REPLACE DCT COEFFICIENTS IN MODIFICATION REGION BY 0, 64 OR −64

Qj(S,T)
Vth1'
Vth2'
64
0
-64
(Yth COLUMN OF Xth ROW)
(Y+1th COLUMN OF Xth ROW)
(Y+2th COLUMN OF Xth ROW)

16
Pi (X, Y)
1
IMAGE DATA STORAGE SECTION
2
FREQUENCY TRANSFORM SECTION
Qi (S, T)
44
MODIFICATION SECTION
Qn (S, T)
6
INVERSE FREQUENCY TRANSFORM SECTION
Pn1 (X, Y)
66
THRESHOLDING SECTION
Po (X, Y)
77
DC COMPONENT DETERMINING SECTION
88
LUT SECTION

17
Pi (X, Y)
1
IMAGE DATA STORAGE SECTION
2
FREQUENCY TRANSFORM SECTION
Qj (S, T)
3
QUANTIZATION SECTION
Qk (S, T)
4
MODIFICATION SECTION
Ql (S, T)
5
INVERSE QUANTIZATION SECTION
Qm (S, T)
6
INVERSE FREQUENCY TRANSFORM SECTION
Pn (X, Y)
66
THRESHOLDING SECTION
Po (X, Y)

FIG. 25A QIc (S, T)

| | | | | | | | |
|---|---|---|---|---|---|---|---|
| | | | | | | | 0 |
| | | | | | | 0 | 0 |
| | | | | | 0 | 0 | 0 |
| | | | | 0 | 0 | 0 | 0 |
| | | | 0 | 0 | 0 | 0 | 0 |
| | | 0 | 0 | 0 | 0 | 1 | 0 |
| | 0 | 0 | 0 | 0 | −1 | −1 | 0 |
| 0 | 0 | 0 | 0 | −1 | 0 | 0 | 0 |

FIG. 25B QIm (S, T)

| | | | | | | | |
|---|---|---|---|---|---|---|---|
| | | | | | | | 0 |
| | | | | | | 0 | 0 |
| | | | | | 0 | 0 | 0 |
| | | | | 0 | 0 | 0 | 0 |
| | | | 0 | 0 | 0 | 0 | 0 |
| | | 0 | 0 | 0 | 0 | 0 | 1 |
| | 0 | 0 | 0 | 0 | −1 | 0 | 1 |
| 0 | 0 | 0 | 0 | −1 | 0 | 0 | 0 |

FIG. 25C QIy (S, T)

| | | | | | | | |
|---|---|---|---|---|---|---|---|
| | | | | | | | 0 |
| | | | | | | 0 | 0 |
| | | | | | 0 | 0 | 0 |
| | | | | 0 | 0 | 0 | 0 |
| | | | 0 | 0 | 0 | 0 | 0 |
| | | 0 | 0 | 0 | 0 | 0 | 1 |
| | 0 | 0 | 0 | 0 | 0 | 1 | −1 |
| 0 | 0 | 0 | 0 | 0 | −1 | 0 | 0 |

FIG. 25D QIk (S, T)

| | | | | | | | |
|---|---|---|---|---|---|---|---|
| | | | | | | | 0 |
| | | | | | | 0 | 0 |
| | | | | | 0 | 0 | 0 |
| | | | | 0 | 0 | 0 | 0 |
| | | | 0 | 0 | 0 | 0 | 0 |
| | | 0 | 0 | 0 | 0 | 0 | −1 |
| | 0 | 0 | 0 | 0 | 1 | 0 | −1 |
| 0 | 0 | 0 | 0 | 1 | 0 | 0 | 0 |

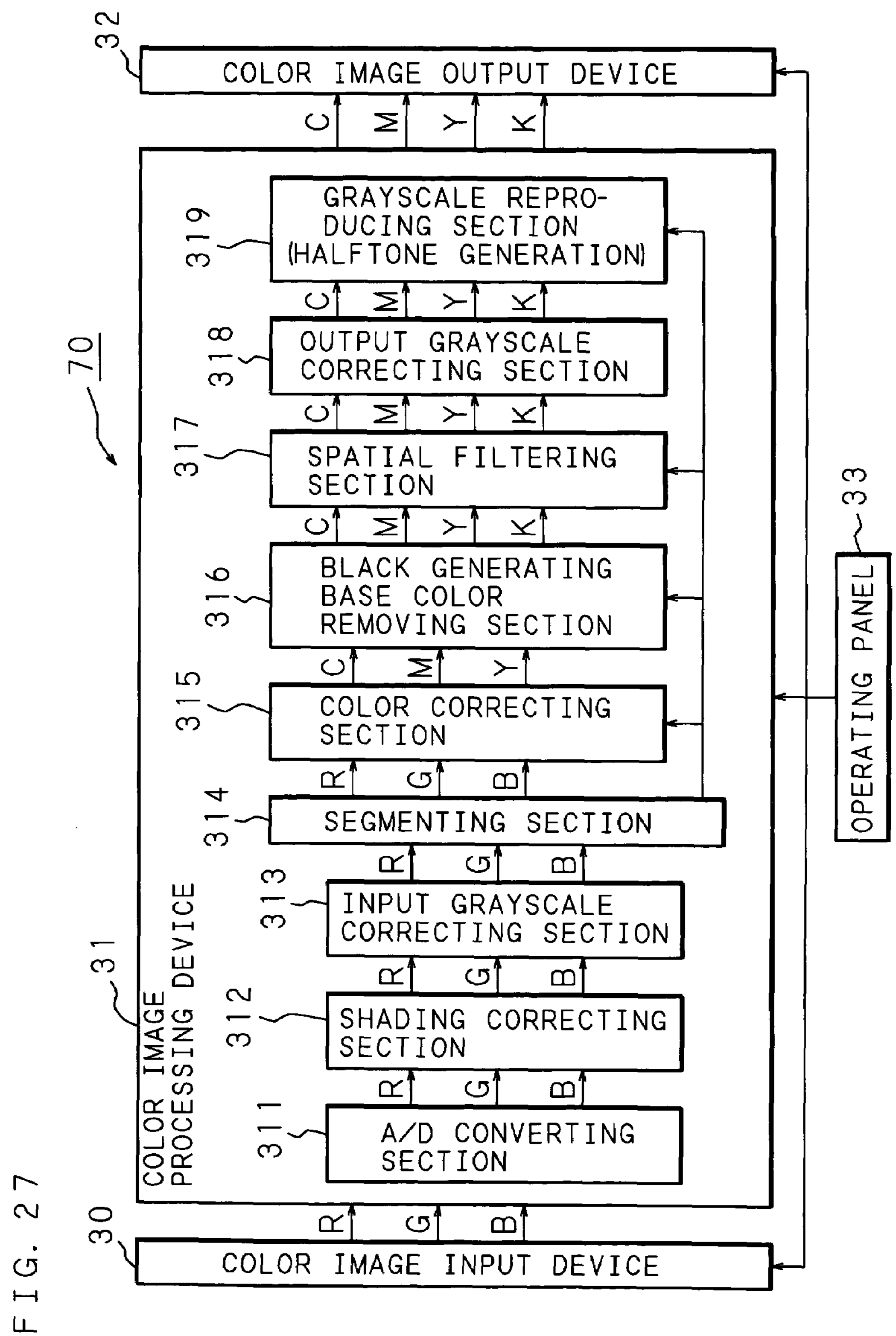
FIG. 27
70
32
COLOR IMAGE OUTPUT DEVICE
C M Y K
31
COLOR IMAGE PROCESSING DEVICE
319
GRAYSCALE REPRODUCING SECTION (HALFTONE GENERATION)
318
OUTPUT GRAYSCALE CORRECTING SECTION
317
SPATIAL FILTERING SECTION
316
BLACK GENERATING BASE COLOR REMOVING SECTION
C M Y
315
COLOR CORRECTING SECTION
R G B
314
SEGMENTING SECTION
313
INPUT GRAYSCALE CORRECTING SECTION
312
SHADING CORRECTING SECTION
311
A/D CONVERTING SECTION
30
COLOR IMAGE INPUT DEVICE
33
OPERATING PANEL 59
PROGRAM
...
FREQUENCY TRANSFORM
QUANTIZATION
MODIFICATION
INVERSE QUANTIZATION
INVERSE FREQUENCY TRANSFORM
THRESHOLDING
...
40
COMPUTER
51
CPU
COLOR CORRECTING SECTION
GRAYSCALE REPRODUCING SECTION
PRINTER LANGUAGE TRANSLATION SECTION
52
RAM
53
HARD DISK
44
COMMUNICATION PORT
54
EXTERNAL STORAGE UNIT
55
INPUT UNIT
56
DISPLAY UNIT
41
PRINTER

IMAGE PROCESSING METHOD, IMAGE PROCESSOR, IMAGE FORMING APPARATUS AND MEMORY PRODUCT

CROSS-REFERENCE TO RELATED APPLICATIONS

This non-provisional application claims priority under 35 U.S.C. §119(a) on Patent Applications No. 2003-273501 filed in Japan on Jul. 11, 2003, No. 2003-334272 filed in Japan on Sep. 25, 2003 and No. 2003-365097 filed in Japan on Oct. 24, 2003, the entire contents of which are hereby incorporated by reference.

BACKGROUND OF THE INVENTION

The present invention relates to an image processing method, an image processor, an image forming apparatus and a memory product for reducing the number of gray levels in image data.

For example, when forming a pseudo-grayscale image including halftones by an image forming apparatus of binary output, it is necessary to perform a binarization process for reducing the number of gray levels to two levels while taking into account the grayscale reproducibility. As the binarization method, various methods have been used, such as a method in which a comparison with a threshold value is performed, a dithering method and an error diffusion method.

On the other hand, there is a method in which compressed image data is generated by coupling a first set of base coefficients in the frequency domain generated by forward transform (for example, discrete cosine transform) of image data and a second set of base coefficients corresponding to the frequency domain of predetermined halftone texture, and quantizing and entropy coding the coupled base coefficients (see, for example, Japanese Patent Application Laid-Open No. 2002-10085).

There is also a method in which compressed data is generated by dividing a grayscale image into a plurality of blocks, forming an average image based on the total of each block, predicting the original grayscale image by using the average image and a halftone screen matrix, generating a remainder image by comparing the predicted image and the original grayscale image, and compressing the generated remainder image and the average image (see, for example, Japanese Patent Application Laid-Open No. 2000-158879).

FIGS. 1A and 1B show examples of dither matrices used in a dithering method. Although a dithering method of binarization is explained as an example, the basic idea is also the same for a multi-valued case. In a dithering method, by using a 4×4 dither matrix in which threshold values of 0 to 15, for example, are set according to positions as shown in FIG. 1A, each pixel value in a 4×4 unit of 16-grayscale input image data is compared with a threshold value, and ON and OFF of each pixel is determined. In the case where the input image data is a 256-grayscale image, as shown in FIG. 1B, values obtained by multiplying the respective values in FIG. 1A by 16 are used as threshold values.

In the dithering method, however, since the binarization process is performed using dither matrices of the same pattern, regular periodic patterns tend to appear in the image on which the binarization process is performed, and there is the problem of repeated texture which is a characteristic of dithering.

An error diffusion method is a method in which binarization is performed while distributing an error caused during binarization of each pixel of the original image (hereinafter referred to as a quantization error) to neighboring pixels which have not yet been binarized . If a pixel to be binarized is denoted as an observed pixel, then the quantization error of the observed pixel is added to the value of each of the pixels surrounding the observed pixel which have not yet been binarized after giving a weight according to the relative position from the observed pixel.

FIG. 2 shows an example of a weighting coefficient matrix used in the error diffusion method. The example of FIG. 2 illustrates a 3×2 weighting coefficient matrix including the observed pixel ($I_X$, $I_Y$) with the horizontal direction (processing direction) as the X direction and the perpendicular direction as the Y direction. The weighting coefficient matrix indicates the weighting coefficients of relative positions (lower left, lower, lower right, right positions) with respect to the observed pixel ($I_X$, $I_Y$). For example, when the observed pixel ($I_X$, $I_Y$) is compared with a threshold value, if the observed pixel ($I_X$, $I_Y$) is larger than the threshold value, it is turned on, but, if the observed pixel ($I_X$, $I_Y$) is smaller, it is turned off. Next, the difference (quantization error) between the determined pixel value of ON or OFF and the pixel value of the observed pixel ($I_X$, $I_Y$) is distributed to the neighboring pixels which have not yet been binarized, based on the weighting coefficient matrix. However, since the pixel ($I_{X-1}$, $I_Y$) on the left of the observed pixel ($I_X$, $I_Y$) is quantized before the observed pixel ($I_X$, $I_Y$), the quantization error is not distributed thereto.

For example, if the quantization error is Err, then Err×(7/16), Err×(1/16), Err×(5/16), and Err×(3/16) are distributed respectively to the right pixel ($I_{X+1}$, $I_Y$), lower right pixel ($I_{X+1}$, $I_{Y+1}$), lower pixel ($I_X$, $I_{Y+1}$), and lower left pixel ($I_{X-1}$, $I_{Y+1}$) with respect to the observed pixel ($I_X$, $I_Y$).

An advantage of the error diffusion method over dithering or other methods is that better quality, such as less moiré pattern in the binarized image, is obtained by the distribution of quantization error to the neighboring pixels which have not yet been processed, based on the weighting coefficient matrix.

In the error diffusion method, however, since the error is diffused based on the same matrix for each pixel, there is a problem that a worm (portion where dots are partly connected) appears in a highlighted area, and a countermeasure such as, for example, adding noise to the threshold value during binarization has been taken (see, for example, "Threshold Adjusting Technique in Error Diffusion Method", Toshiaki Kakutani, Journal of the Society of Electrophotography, 1998, Vol. 37, No. 2, p. 186-192).

In recent layers, with the improvement of the performance of image forming apparatuses such as ink jet printers, many image forming apparatus can provide multi-value output such as ternary output and quaternary output instead of binary output, and multi-valuing processing such as a multi-value error diffusion method, for example, is performed in these image forming apparatuses. The principle of the multi-value error diffusion method is basically the same as the error diffusion method of binarization, but differs in that input image data is quantized using two or more threshold values, and ternary or higher-value image data is outputted.

For example, in the case where error diffusion of quaternary output is performed on 256-grayscale image data with densities of 0 to 255, the output levels (values quantized by thresholding) can be 0, 85, 171 and 255, and the threshold values can be 42, 128 and 214. In this case, output levels are determined by successively comparing the pixel value of the observed pixel with the three threshold values. For instance, if an output level is smaller than the threshold value of 42, the output level is determined 0; and if an output level is smaller than the threshold value of 128, the output level is determined 85; otherwise the output level is determined 171 or 255 by comparison with the threshold value of 214.

However, in a multi-value image such as a quaternary image, since the dot patterns become uniform in an intermediate density region, there is a problem of tone gap (phenomenon in which gray levels change non-continuously). For example, when the output level is 0, 85, 171, or 255, a tone gap tends to occur in the vicinity of the intermediate density regions, 85 and 171, due to concentration of the same density. If quantization is performed with a plurality of threshold values, a tone gap definitely occurs. For instance, even in the case of binary output, a tone gap occurs in the vicinity of 0 or 255, but, in the case of multi-value output, since there is an output level of intermediate density which is easily noticed by human eyes, the tone gap in the intermediate density region is noticeable. It is difficult to perfectly prevent a tone gap in the intermediate density region by an algorism of performing quantization by appropriately selecting a plurality of threshold values for use in the intermediate density region.

In the methods disclosed in Japanese Patent Applications Laid-Open No. 2002-10085 and No. 2002-158879, data (frequency components) transformed into a predetermined halftone frequency domain is used, but, since predetermined halftone data is used, there is a problem such as occurrence of texture similarly to the above-mentioned error diffusion method or dithering method. In other words, the methods of Japanese Patent Applications Laid-Open No. 2002-10085 and No. 2002-158879 merely perform halftone processing in the frequency domain by using a method similar to the above-mentioned conventional methods.

Further, in the above-mentioned respective conventional techniques, since overlapping of dots of respective colors is not taken into account, not only dots of respective colors are formed on paper in an overlapped fashion, but also a pixel where a dot of any color is not formed tends to appear, and consequently there is a drawback that graininess becomes worse and causes a noisy rough image. In order to avoid this, for example, a dithering method needs to use different dither matrix for each color, or perform a special process such as determining the presence/absence of dot and shifting the dot position for each color, which causes in increase in the memory capacity and an increase in the amount of calculation, resulting in a problem of an increase in the calculation cost.

BRIEF SUMMARY OF THE INVENTION

The present invention has been made with the aim of solving the above problems, and it is an object of the invention to provide an image processing method, an image processor, an image forming apparatus and a memory product capable of solving the problem of tone gap which occurs in the vicinity of output levels of image data and forming a high-quality binary image, quaternary image, etc. by changing, for example, high-frequency components of image data.

Another object of the invention is to provide an image processing method, an image processor, an image forming apparatus and a memory product capable of reducing the texture caused in dithering and worms caused in error diffusion and forming a high-quality binary image, quaternary image, etc. by changing, for example, high-frequency components of the image data.

Still another object of the invention is to provide an image processing method, an image processor, an image forming apparatus and a memory product capable of shortening the processing time by omission of a quantization process and an inverse quantization process, without deteriorating the image quality.

Yet another object of the invention is to provide an image processor and an image forming apparatus capable of solving the problem of tone gap without deteriorating the image quality by changing high frequency components but not changing low frequency components which occupy the major part of the image.

A further object of the invention is to provide an image processor and an image forming apparatus capable of forming a binary image, quaternary image, etc. having smooth grayscale reproducibility by changing the number of frequency components to be changed, according to the magnitude of a DC component.

A further object of the invention is to provide an image processor and an image forming apparatus capable of improving the dispersion of dots in a highlighted area, reducing occurrence of worms, and reducing occurrence of a texture in an intermediate density region by changing the frequency components by using modification values based on blue noise.

A further object of the invention is to provide an image processing method, an image processor, an image forming apparatus and a memory product capable of preventing overlapping of dots between respective color components and reducing deterioration of image quality due to overlapping of dots of different color components by changing spatial frequency components obtained by performing a frequency transform for each color component so that the spatial frequency components do not overlap each other.

A further object of the invention is to provide an image processing method, an image processor, an image forming apparatus and a memory product capable of forming dots of desired color components in an overlapped fashion by changing spatial frequency components obtained by performing a frequency transform for each of color components so that the spatial frequency components of a plurality of predetermined color components overlap each other.

A further object of the invention is to provide an image processing method, an image processor, an image forming apparatus and a memory product capable of controlling the formation positions of dots of the respective color components by performing a modification process on spatial frequency components other than a low frequency domain among frequency components obtained by the frequency transform so that deterioration of image quality is less noticeable to human eyes.

A further object of the invention is to provide an image processor capable of reducing the data amount of frequency components to be processed and reducing the processing burden by quantizing spatial frequency components obtained by the frequency transform.

An image processing method of the present invention comprises the steps of transforming image data into spatial frequency components; quantizing the transformed spatial frequency components; performing a modification process of changing spatial frequency components in a predetermined frequency domain on the quantized spatial frequency components; inverse-quantizing the spatial frequency components on which the modification process is performed; inverse-transforming the inverse-quantized spatial frequency components into image data; and reducing the number of gray levels in the inverse-transformed image data, based on a threshold value.

An image processor of the present invention comprises: a frequency transform section for transforming image data into spatial frequency components; a quantization section for quantizing the spatial frequency components transformed in the frequency transform section; a modification section for performing a modification process of changing spatial frequency components in a predetermined frequency domain on the spatial frequency components quantized in the quantization section; an inverse quantization section for inverse-quantizing the spatial frequency components on which the modification process is performed in the modification section; an inverse frequency transform section for inverse-transforming the spatial frequency components inverse-quantized in the inverse quantization section into image data; and a thresholding section for reducing the number of gray levels in the image data inverse-transformed in the inverse frequency transform section, based on a threshold value.

According to the present invention, image data is transformed into spatial frequency components, the transformed spatial frequency components are quantized, a modification process of changing spatial frequency components in a predetermined frequency domain is performed on the quantized spatial frequency components, the spatial frequency components on which the modification process is performed are inverse-quantized, and the inverse-quantized spatial frequency components are inverse-transformed into image data. The number of gray levels in the inverse-transformed image data is reduced by, for example, quaternarization using threshold values. The image data having a reduced number of gray levels is formed, for example, on recording paper. For example, the modification section changes spatial frequency components other than a low frequency domain. By changing the spatial frequency components other than the low frequency domain, the change is less noticeable to human eyes. By changing the spatial frequency components other than the low frequency domain and controlling the dots of image data, it is possible to reduce occurrence of tone gap, texture, worms, etc. Moreover, since the number of gray levels is reduced simply by comparison with a threshold value, it is possible to solve the problems of texture or worms caused in dithering methods or error diffusion methods. Further, since the spatial frequency components after quantization are changed, the numerals handled in the modification process are smaller than those before quantization. Since the modification process is performed on the quantized spatial frequency components, the number of bits of the spatial frequency components to be handled in the modification process is smaller, thereby enabling a decrease in the memory capacity and a reduction in the cost. In addition, the quantized spatial frequency components are easy to handle because the number of bits is smaller, and therefore the control of dots of image data is readily adjusted.

An image processing method of the present invention comprises the steps of: transforming image data into spatial frequency components; performing a modification process of changing spatial frequency components in a predetermined frequency domain on the transformed spatial frequency components; inverse-transforming the spatial frequency components on which the modification process is performed into image data; and reducing the number of gray levels in the inverse-transformed image data, based on a threshold value.

An image processor of the present invention comprises: a frequency transform section for transforming image data into spatial frequency components; a modification section for performing a modification process of changing spatial frequency components in a predetermined frequency domain on the spatial frequency components transformed in the frequency transform section; an inverse frequency transform section for inverse-transforming the spatial frequency components on which the modification process is performed in the modification section into image data; and a thresholding section for reducing the number of gray levels in the image data inverse-transformed in the inverse frequency transform section, based on a threshold value.

According to the present invention, image data is transformed into spatial frequency components, a modification process of changing spatial frequency components in a predetermined frequency domain is performed on the transformed spatial frequency components, and the spatial frequency components on which the modification process is performed are inverse-transformed into image data. The number of gray levels in the inverse-transformed image data is reduced by, for example, quaternarization using threshold values. The image data having a reduced number of gray levels is formed, for example, on recording paper. For example, the modification section changes spatial frequency components other than a low frequency domain. By changing the spatial frequency components other than the low frequency domain, the change is less noticeable to human eyes. By changing the spatial frequency components other than the low frequency domain and controlling the dots of image data, it is possible to reduce occurrence of tone gap, texture, worms, etc. Moreover, since the number of gray levels is reduced simply by comparison with a threshold value, it is possible to solve the problems of texture or worms caused in dithering methods or error diffusion methods. Further, the processing time can be shortened by omission of the quantization process and inverse quantization process. In addition, since quantization errors do not occur, the image quality before the thresholding process is improved, and the processing time can be shortened without deteriorating the image.

An image processor of the present invention comprises: a frequency transform section for transforming image data into spatial frequency components; a modification section for performing a modification process of changing spatial frequency components in a predetermined frequency domain on the spatial frequency components transformed in the frequency transform section; a quantization section for quantizing the spatial frequency components on which the modification process is performed in the modification section; an inverse quantization section for inverse-quantizing the spatial frequency components quantized in the quantization section; an inverse frequency transform section for inverse-transforming the spatial frequency components inverse-quantized in the inverse quantization section into image data; and a thresholding section for reducing the number of gray levels in the image data inverse-transformed in the inverse frequency transform section, based on a threshold value.

According to the present invention, image data is transformed into spatial frequency components, a modification process of changing spatial frequency components in a predetermined frequency domain is performed on the transformed spatial frequency components, the spatial frequency components on which the modification process is performed are quantized, the quantized spatial frequency components are inverse-quantized, and the inverse-quantized spatial frequency components are inverse-transformed into image data. The number of gray levels in the inverse-transformed image data is reduced by, for example, quaternarization using threshold values. The image data having a reduced number of gray levels is formed, for example, on recording paper. For example, the modification section changes spatial frequency components other than a low frequency domain. Since the spatial frequency components in the low frequency domain represent the general part of the image data, the change is noticeable to human eyes and degrades the image quality. By changing the spatial frequency components other than the low frequency domain, the change is less noticeable to human eyes. By changing the spatial frequency components other than the low frequency domain and controlling the dots of image data, it is possible to reduce occurrence of tone gap, texture, worms, etc. Moreover, since the number of gray levels is reduced simply by comparison with a threshold value, it is possible to solve the problems of texture or worms caused in dithering methods or error diffusion methods.

In the image processor of the present invention, the predetermined frequency domain is a high frequency domain in the entire frequency domain of the spatial frequency components. In the present invention, the modification section changes the spatial frequency components in the high frequency domain. Since the spatial frequency components in the high frequency domain represent the detailed part of the image data, even when a change is made, the change of the image data is hardly noticed by human eyes and causes almost no deterioration in the image quality. By changing the spatial frequency components in the high frequency domain, the change of the image data is hardly noticed by human eyes, and thus it is possible to prevent deterioration of image quality. Since the high frequency components are changed without changing the low frequency components which occupy the major part of the image, it is possible to solve the problems of tone gap, etc. without deteriorating the image quality.

The image processor of the present invention comprises: a detecting section for detecting a direct current component contained in the spatial frequency components; and a determining section for determining the number of changes corresponding to the direct current component detected by the detecting section, and the modification section changes a number of spatial frequency components corresponding to the number of changes determined by the determining section. The number of spatial frequency components to be changed is controlled according to the direct current component representing the average value of alternating current components contained in the spatial frequency components. By increasing or decreasing the number of spatial frequency components to be changed according to the magnitude of the direct current component, it is possible to increase or decrease the number of dots to be outputted and generate a halftone image having smoother grayscale reproducibility (and reduced tone gap).

The image processor of the present invention comprises a storage section for storing modification values corresponding to the respective spatial frequency components in the predetermined frequency domain, and the modification section changes the spatial frequency components in the predetermined frequency domain, based on the corresponding modification values stored in the storage section. By storing optimum modification values in the storage section in advance, it is possible to optimally control the dots of image data. Since the modification values of spatial frequency components are stored in advance, it is possible to preset optimum modification values. By presetting modification values so as to achieve balanced dot reproducibility and changing the spatial frequency components in the high frequency domain, even when binarization, quaternarization or the like is performed using threshold values, it is possible to obtain a binary image, quaternary image, etc. with a good grayscale balance as a whole. In addition, it is possible to simply and quickly determine the modification values without requiring a complicated calculation process.

In an image processor of the present invention, the modification section replaces the spatial frequency components in the predetermined frequency domain with the corresponding modification values. By replacing the spatial frequency components with the modification values preset in the storage section, it is possible to perform preset dot control for the image data. By performing optimum dot control, it is possible to reduce the occurrence of tone gap, texture, worms, etc. By presetting modification values so as to achieve balanced dot reproducibility and changing the spatial frequency components in the high frequency domain, even when binarization, quaternarization or the like is performed using threshold values, it is possible to obtain a binary image, quaternary image, etc. with a good grayscale balance as a whole.

In the image processor of the present invention, the modification section adds the corresponding modification values to the spatial frequency components in the predetermined frequency domain. By adding the modification values set in the storage section to the corresponding spatial frequency components, it is possible to change the spatial frequency components while reducing loss of the original spatial frequency components. Since dot control that reduces loss of the original spatial frequency components is performed, it is possible to minimize the change to the original image data and reduce the occurrence of tone gap, texture, worms, etc.

In the image processor of the present invention, the modification values are values based on noise data. For example, by replacing or adding spatial frequency components of random noise data for or to the spatial frequency components subjected to the modification process, it is possible to reduce the occurrence of tone gap, texture, worms, etc.

In the image processor of the present invention, the noise data is blue noise data. Since the blue noise is hardly recognized by human eyes, it is possible to minimize the influence on the original image data and change the spatial frequency components subjected to modification. By changing the spatial frequency components using modification values based on blue noise which is hardly perceived by human's visual characteristics, it is possible to improve the dispersion of dots in a highlighted area and reduce occurrence of worms, or reduce occurrence of texture in an intermediate density region.

An image processing method of the present invention comprises the steps of transforming image data including a plurality of color components into spatial frequency components; performing a modification process of changing spatial frequency components in a predetermined frequency domain on the transformed spatial frequency components; inverse-transforming the spatial frequency components on which the modification process is performed into image data; and reducing the number of gray levels in the inverse-transformed image data, based on a predetermined threshold value, wherein the modification process is performed so that the spatial frequencies of the plurality of color components do not overlap each other.

An image processor of the present invention comprises: a frequency transform section for transforming image data including a plurality of color components into spatial frequency components; a modification section for performing a modification process of changing spatial frequency components in a predetermined frequency domain on the spatial frequency components transformed in the frequency transform section; an inverse frequency transform section for inverse-transforming the spatial frequency components on which the modification process is performed in the modification section into image data; and a thresholding section for reducing the number of gray levels in the image data inverse-transformed in the inverse frequency transform section, based on a predetermined threshold value, wherein the modification section performs the modification process so that the spatial frequency components of the plurality of color components do not overlap each other.

According to the present invention, image data including a plurality of color components is transformed into spatial frequency components on a color-by-color basis, a modification process is performed on the transformed spatial frequency components so that the spatial frequency components of the respective color components do not overlap each other, and the spatial frequency components on which the modification process is performed are inverse-transformed into image data. Moreover, the number of gray levels in the inverse-transformed image data is reduced by, for example, quaternarization using predetermined threshold values, and the image data having a reduced number of gray levels is formed on recording paper, for example. Further, a modification process of changing the frequency components in the high frequency domain in the entire frequency domain of the spatial frequency components of predetermined two color components, for example, the black component and other color component, is performed so that their signs are opposite, or a modification process of changing the frequency components in the high frequency domain of the spatial frequency components of the cyan component and magenta component is performed so that their signs are opposite. By changing the spatial frequency components obtained by performing a frequency transform for each color component so that they do not overlap each other, it is possible to prevent overlapping of dots between the respective color components and reduce the deterioration of image quality due to overlapping of dots of different color components. Consequently, the formation position of dots of the respective colors can be easily controlled, and smooth, high-quality image data with reduced graininess can be generated without requiring a structure for performing a complicated process such as determining the presence/absence of dot of each color component and shifting the position of the respective dots.

In the image processor of the present invention, the modification section performs a modification process of changing the frequency components in a high frequency domain in the entire frequency domain of the spatial frequency components of predetermined two color components so that their signs are opposite. Since the spatial frequency components in a low frequency domain represent the general part of the image data, if a change is made, the change is noticeable to human eyes and the deterioration of the image quality is noticeable. Since spatial frequency components other than the low frequency domain represent the detailed part of the image data, even when a change is made, the change is hardly noticed by human eyes and causes almost no deterioration in the image quality. Thus, by changing the spatial frequency components other than the low frequency domain, it is possible to control the positions of dots in the image data, solve the problem of tone gap which occurs in the vicinity of output levels of the image data, prevent occurrence of texture caused by dithering and worms caused by error diffusion, and generate a high-quality binary image, quaternary image, etc.

In an image processor of the present invention, one of the predetermined two color components is black. In the case where black which has the strongest influence on other colors is used and overlapping a black dot and a dot of other color may cause considerable deterioration in image quality, this image processor can most effectively improve the image quality by changing the spatial frequency components of the black component and the other color component so that they do not overlap each other.

In an image processor of the present invention, the predetermined two color components are cyan and magenta. By changing the spatial frequency components of the cyan component and magenta component so that they do not overlap each other, this image processor can also effectively improve the image quality in respect of colors such as cyan and magenta which are most frequently used colors, easily cause overlapping of dots and degradation of the image if the dots overlap.

An image processing method of the present invention comprises the steps of: transforming image data including a plurality of color components into spatial frequency components; performing a modification process of changing spatial frequency components in a predetermined frequency domain on the transformed spatial frequency components; inverse-transforming the spatial frequency components on which the modification process is performed into image data; and reducing the number of gray levels in the inverse-transformed image data, based on a predetermined threshold value, wherein the modification process is performed so that the spatial frequencies of a plurality of predetermined color components overlap each other.

An image processor of the present invention comprises: a frequency transform section for transforming image data including a plurality of color components into spatial frequency components; a modification section for performing a modification process of changing spatial frequency components in a predetermined frequency domain on the spatial frequency components transformed in the frequency transform section; an inverse frequency transform section for inverse-transforming the spatial frequency components on which the modification process is performed in the modification section into image data; and a thresholding section for reducing the number of gray levels in the image data inverse-transformed in the inverse frequency transform section, based on a predetermined threshold value, wherein the modification section performs the modification process so that the spatial frequency components of a plurality of predetermined color components overlap each other.

In an image processor of the present invention, the modification section performs a modification process of changing the frequency components in a high frequency domain in the entire frequency domain of the spatial frequency components of a plurality of predetermined color components so that their signs are equal.

According to the present invention, image data including a plurality of color components is transformed into spatial frequency components, a modification process is performed on the transformed spatial frequency components so that the spatial frequency components of a plurality of predetermined color components overlap each other, and the spatial frequency components on which the modification process is performed are inverse-transformed into image data. Moreover, the number of gray levels in the inverse-transformed image data is reduced by, for example, quaternarization using predetermined threshold values, and the image data having a reduced number of gray levels is formed on recording paper, for example. Further, a modification process of changing the frequency components in the high frequency domain of the spatial frequency components of a plurality of predetermined color components is performed so that their sings are equal. By changing the spatial frequency components obtained by performing a frequency transform for each color component so that the spatial frequency components of the predetermined color components overlap each other, it is possible to form dots of desired color components in an overlapped fashion, and, for example, if an ink-jet type image forming apparatus is used, it is possible to prevent an ink from running onto the next dot of other color and reduce deterioration of image quality due to running of the ink.

An image processor of the present invention further comprises: a quantization section for quantizing the spatial frequency components transformed in the frequency transform section; and an inverse quantization section for inverse-quantizing the spatial frequency components on which the modification process is performed in the modification section, wherein the modification section changes the spatial frequency components in a predetermined frequency domain of the spatial frequency components quantized in the quantization section, and the inverse frequency transform section inverse-transforms the spatial frequency components inverse-quantized in the inverse quantization section into image data.

According to the present invention, the spatial frequency components obtained by the frequency transform are quantized, and the above-mentioned modification process is performed on the quantized spatial frequency components. The spatial frequency components on which the modification process is performed are inverse-quantized, the inverse-quantized spatial frequency components are inverse-transformed into image data, the number of gray levels in the inverse-transformed image data is reduced by, for example, quaternarization using predetermined threshold values, and the image data having a reduced number of gray levels is formed on recording paper, for example. It is possible to reduce the data amount of frequency components to be changed, and it is possible to reduce the processing burden in the image processor.

An image forming apparatus of the present invention comprises the above-described image processor, and forms image data having a reduced number of gray levels by reducing the number of gray levels with the image processor.

A computer program stored on a memory product of the present invention comprises the steps of: causing a computer to transform image data into spatial frequency components; causing the computer to quantize the transformed spatial frequency components; causing the computer to perform a modification process of changing spatial frequency components in a predetermined frequency domain on the quantized spatial frequency components; causing the computer to inverse-quantize the spatial frequency components on which the modification process is performed; causing the computer to inverse-transform the inverse-quantized spatial frequency components into image data; and causing the computer to reduce the number of gray levels in the inverse-transformed image data, based on a threshold value.

A computer program stored on a memory product of the present invention comprises the steps of: causing a computer to transform image data into spatial frequency components; causing the computer to perform a modification process of changing spatial frequency components in a predetermined frequency domain on the transformed spatial frequency components; causing the computer to inverse-transform the spatial frequency components on which the modification process is performed into image data; and causing the computer to reduce the number of gray levels in the inverse-transformed image data, based on a threshold value.

A computer program stored on a memory product of the present invention comprises the steps of: causing a computer to transform image data including a plurality of color components into spatial frequency components; causing the computer to perform a modification process of changing spatial frequency components in a predetermined frequency domain of the plurality of color components on the transformed spatial frequency components so that they do not overlap each other; causing the computer to inverse-transform the spatial frequency components on which the modification process is performed into image data; and causing the computer to reduce the number of gray levels in the inverse-transformed image data, based on a predetermined threshold value.

A computer program stored on a memory product of the present invention comprises the steps of: causing a computer to transform image data including a plurality of color components into spatial frequency components; causing the computer to perform a modification process of changing spatial frequency components in a predetermined frequency domain of a plurality of predetermined color components on the transformed spatial frequency components so that they overlap each other; causing the computer to inverse-transform the spatial frequency components on which the modification process is performed into image data; and causing the computer to reduce the number of gray levels in the inverse-transformed image data, based on a predetermined threshold value.

The above and further objects and features of the invention will more fully be apparent from the following detailed description with accompanying drawings.

BRIEF DESCRIPTION OF THE SEVERAL VIEWS OF THE DRAWINGS

FIGS. 1A and 1B are views showing examples of dither matrices;

FIG. 3 is a block diagram showing an example of the structure of an image processor (Embodiment 1) of the present invention;

FIGS. 6A and 6B are views showing an example of changing DCT coefficients;

FIGS. 13A, 13B and 13C are views showing an example of changing DCT coefficients using LUT;

FIG. 14 is a block diagram showing an example of the structure of an image processor (Embodiment 5) of the present invention;

FIGS. 16A, 16B and 16C are views showing examples of optimized data tables (blue noise LUT);

FIGS. 18A and 18B are views showing examples of blue noise LUT using real numbers of decimal fractions;

FIGS. 20A and 20B are views showing an example of changing DCT coefficients;

FIGS. 25A, 25B, 25C and 25D are views showing examples of modification values of DCT coefficients;

FIG. 27 is a block diagram showing an example of the structure of an image forming apparatus of the present invention;

DETAILED DESCRIPTION OF THE INVENTION

Figure 2:
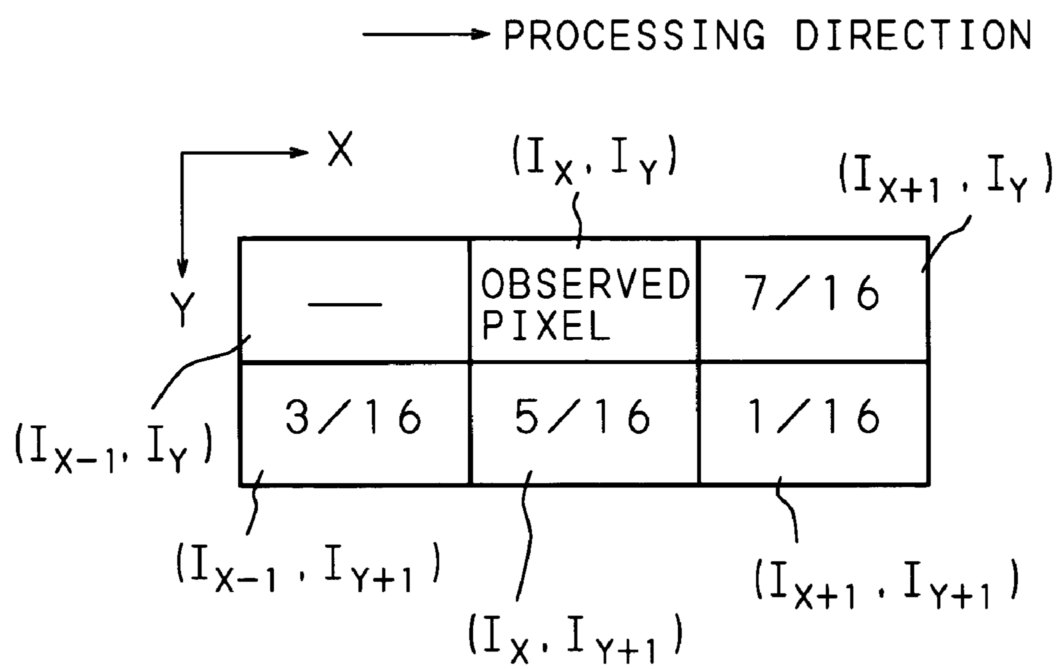
FIG. 2 is a view showing an example of a weighting coefficient matrix.

The following description will explain in detail the present invention, based on the drawings illustrating some embodiments thereof.

Embodiment 1

FIG. 3 is a block diagram showing an example of the structure of a grayscale reproduction processor (image processor) 10 of the present invention. The grayscale reproduction processor 10 is an image processor for generating output image data Po (X, Y) by reducing the number of gray levels (for example, 256 gray levels) of input image data Pi (X, Y) to two levels or four levels. Here, the input image data Pi (X, Y) is pixel data at the Xth pixel position on the Yth line of image data composed of pixels arranged in a two-dimensional matrix of the X-direction (right direction) and Y direction (down direction), and a large number of input image data Pi (X, Y) constitute a two-dimensional image.

The grayscale reproduction processor 10 comprises: an image data storage section 1 for storing input image data Pi (X, Y); a frequency transform section 2 for transforming the input image data Pi (X, Y) into spatial frequency components Qj (S, T); a quantization section 3 for quantizing the spatial frequency components Qj (S, T); a modification section 4 for changing a part of the quantized spatial frequency components Qk (S, T); an inverse quantization section 5 for inverse-quantizing the partly changed spatial frequency components Ql (S, T); an inverse frequency transform section 6 for performing an inverse frequency transform of the inverse-quantized spatial frequency components Qm (S, T); a thresholding section 66 for thresholding the inverse-frequency-transformed image data Pn (X, Y); and a controller (not shown) for controlling these sections, and outputs output image data Po (X, Y) obtained by the thresholding process.

In the image data storage section 1, input image data Pi (X, Y) constituting a two-dimensional image are successively stored. The input image data Pi (X, Y) are successively outputted to the frequency transform section 2 so that 8×8 pixels are outputted as one block, for example, under the control of the controller. The frequency transform section 2 transforms the image data outputted on a block-by-block basis into the frequency domain (frequency transform). A discrete cosine transform (DCT) is explained as an example below. If an input image is $A_{ij}$, an output image is $B_{ij}$ and the sizes of the row and column of input image A are M and N, respectively, then the DCT is expressed by the following formula 1 below. Note that the frequency transform is not limited to the DCT, and can be implemented by, for example, a DWT (Discrete Wavelet Transform), or a DFT (Discrete Fourier Transform).

$$B_{pq} = \alpha_p \alpha_q \sum_{m=0}^{M-1} \sum_{n=0}^{N-1} A_{mn} \cos \frac{\pi(2m+1)p}{2M} \cos \frac{\pi(2n+1)q}{2N} \begin{pmatrix} 0 \le p \le M-1 \\ 0 \le q \le N-1 \end{pmatrix} \quad \text{(formula 1)}$$

$$\alpha_p = \begin{cases} 1\sqrt{M} & (p = 0) \\ \sqrt{2/M} & (1 \le p \le M-1) \end{cases}$$

$$\alpha_q = \begin{cases} 1\sqrt{N} & (q = 0) \\ \sqrt{2/N} & (1 \le q \le N-1) \end{cases}$$

The frequency transform section 2 receives the image data including 8×8 pixels as one block from the image data storage section 1, performs the DCT transform, and sends spatial frequency components obtained by the DCT transform (hereinafter referred to as DCT coefficients) Qj (S, T) to the quantization section 3. In this explanation, for the two-dimensional image, the DCT transform is performed on a block-by-block basis in the right direction (X-direction) from a block including the highest left pixel, and the DCT transform is performed until the last block including the lowest right pixel while changing lines on a block-by-block basis.

Figure 4:
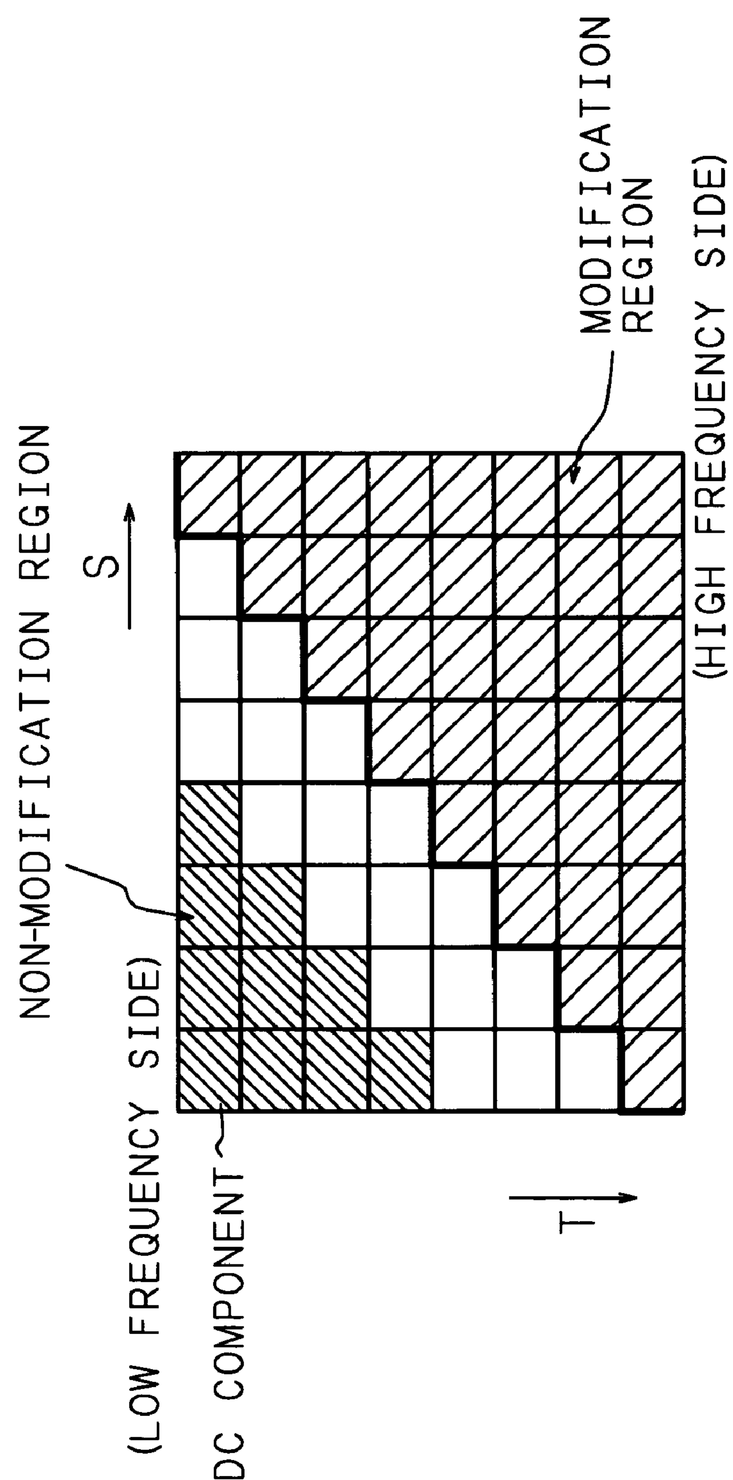
FIG. 4 is a view showing an example of a region (modification region) in which DCT coefficients are changed.
Figure 5:
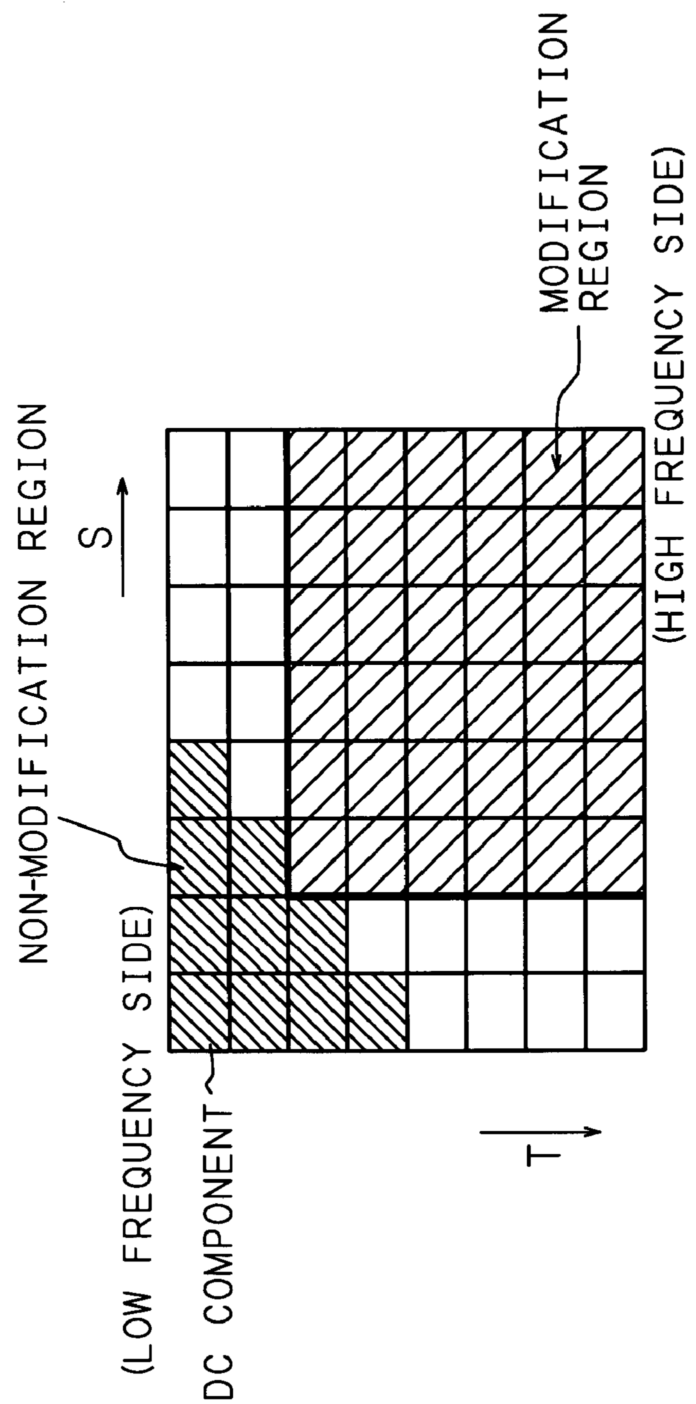
FIG. 5 is a view showing an example of a region (modification region) in which DCT coefficients are changed.

The quantization section 3 quantizes the DCT coefficients Qj (S, T) received from the frequency transform section 2. The DCT coefficients Qj (S, T) are divided by a fixed threshold value in the quantization section 3. For example, all values are divided by 64. The modification section 4 changes the quantized DCT coefficients Qk (S, T) on a block-by-block basis. A change is not made to all DCT coefficients in one block, but is made only to a part of 8×8 DCT coefficients in one block FIG. 4 and FIG. 5 are views showing examples of a region (modification region) in which the DCT coefficients are changed. The DCT coefficients obtained by the DCT transform of image data include a direct current component (hereinafter referred to as the DC component) in the upper left corner and remaining alternating current components (hereinafter referred to as the AC components). Changing of DCT coefficients is not applied to a region on the low frequency side (upper left side) including the DC component, but changing of DCT coefficients is performed in a region on the high frequency side (lower right side).

In the examples of FIG. 4 and FIG. 5, the first to fourth columns of the first row, the first to third columns of the second row, the first and second columns of the third row, and the first column of the fourth row are a non-modification region where the frequency is not changed. Besides, in the example of FIG. 4, the eighth column on the first row, the seventh and eighth columns of the second row, the sixth to eighth columns of the third row, the fifth to eighth columns of the fourth row, the fourth to eighth columns of the fifth row, the third to eighth columns of the sixth row, the second to eighth columns of the seventh row, and the first to eighth columns of the eighth row are a modification region where the frequency is changed. Further, in the example of FIG. 5, the third to eighth columns of the third row, the third to eighth columns of the fourth row, the third to eighth columns of the fifth row, the third to eighth columns of the sixth row, the third to eighth columns of the seventh row, and the third to eighth columns of the eighth row are a modification region. Note that the modification region may be set to other region other than the DC component. The setting pattern of the modification region is stored, for example, in the modification section 4 or the controller (not shown) in advance.

The modification section 4 replaces (changes) the respective DCT coefficients in the modification region by, for example, 0, 1 or −1. FIGS. 6A and 6B are views showing an example of changing DCT coefficients, and FIG. 6A shows the DCT coefficients Qk(S, T) before the change, while FIG. 6B shows the DCT coefficients Ql (S, T) after the change in the modification section 4. Note that although FIGS. 6A and 6B show an example of changing the modification region shown in FIG. 4, changing is not limited to this example. Replacement (changing) of the DCT coefficients in the modification region can be implemented by, for example, comparing whether each of the DCT coefficients Qj (S, T) after the frequency transform is larger or smaller than two threshold values Vth1, Vth2 (here, Vth1>Vth2) and replacing them by 0, 1 or −1 according to the comparison results.

Figure 7:
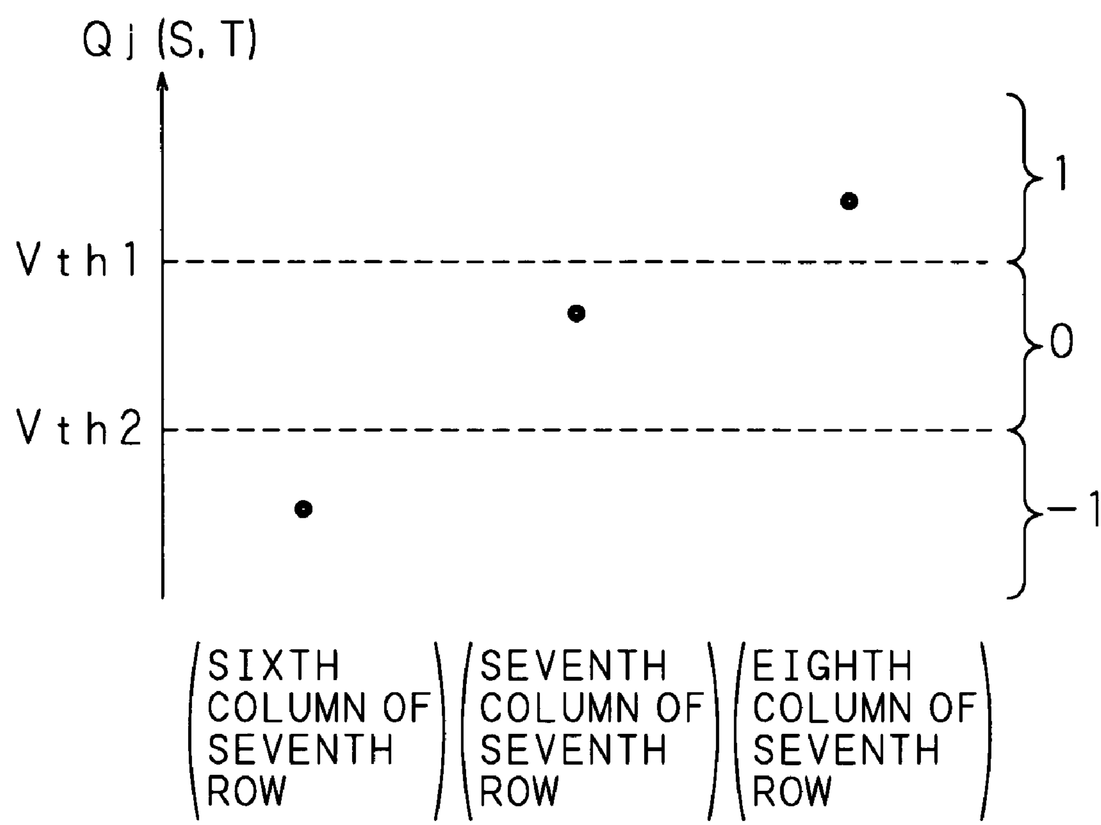
FIG. 7 is a view showing an example of modification values of DCT coefficients based on comparison with threshold values.

FIG. 7 is a view showing an example of the modification values of the DCT coefficients based on the comparison with the threshold values. FIG. 7 shows an example of the modification values of the DCT coefficients in the sixth to eighth columns of the seventh row of the block shown in FIG. 6, wherein the DCT coefficient Qj (S, T) is replaced by −1 when it is not larger than Vth2, the DCT coefficient Qj (S, T) is replaced by 1 when it is not smaller than Vth1, and the DCT coefficient Qj (S, T) is replaced by 0 when it is between Vth1 and Vth2. The respective blocks are rarely changed in the same pattern, but they are changed randomly (irregularly).

The modification section 4 sends the DCT coefficients Ql (S, T) after the modification process to the inverse quantization section 5. The inverse quantization section 5 inverse-quantizes the DCT coefficients Ql (S, T) changed in the modification section 4. In this explanation, all DCT coefficients in a block are multiplied by 64. The inverse frequency transform section 6 performs an inverse frequency-transform on the DCT coefficients Qm (S, T) obtained in the inverse quantization section 5 so as to transform them into density domain data (image data). For a two-dimensional inverse DCT transform, the inverse transform of formula 1 is performed. When a natural image is quantized ($\frac{1}{64}$times) by the DCT transform, the DCT coefficients have a distribution of values ranging from substantially about −1 to about 1, except for the DC component and the low-frequency domain. If the data in the high-frequency domain is changed to 0, 1, −1, the influence on the original image data is minimized, and the arrangement of dots in the density space can be changed.

The thresholding section 66 transforms the density domain data (image data) Pn (S, Y) received from the inverse frequency transform section 6 into multi-value density data (output image data) Po (X, Y) by using a plurality of threshold values. For example, in the case of quaternary output, the transform is performed using three threshold values as follows:

if 0<Pn (X, Y)≦42, then Po (X, Y)=0,
if 42<Pn (X, Y)≦127, then Po (X, Y)=85,
if 127<Pn (X, Y)≦212, then Po (X, Y)=171, and
if 212<Pn (X, Y)≦255, then Po (X, Y)=255.

Thus, after transforming the input image data Pi (X, Y) stored in the image data storage section 1 into the frequency domain and changing a part thereof, the data is inverse-transformed and finally becomes the output image data Po (X, Y) with a reduced number of gray levels such as four levels by performing a thresholding process for all pixels.

When performing thresholding on a two-dimensional image, a conventional thresholding process in which thresholding is repeated using matrices of the same pattern is not executed, but noise is added by changing the spatial frequency components (DCT coefficients), and therefore conventional problems such as occurrence of worms, texture and tone gap can be solved.

Embodiment 2

Figure 8:
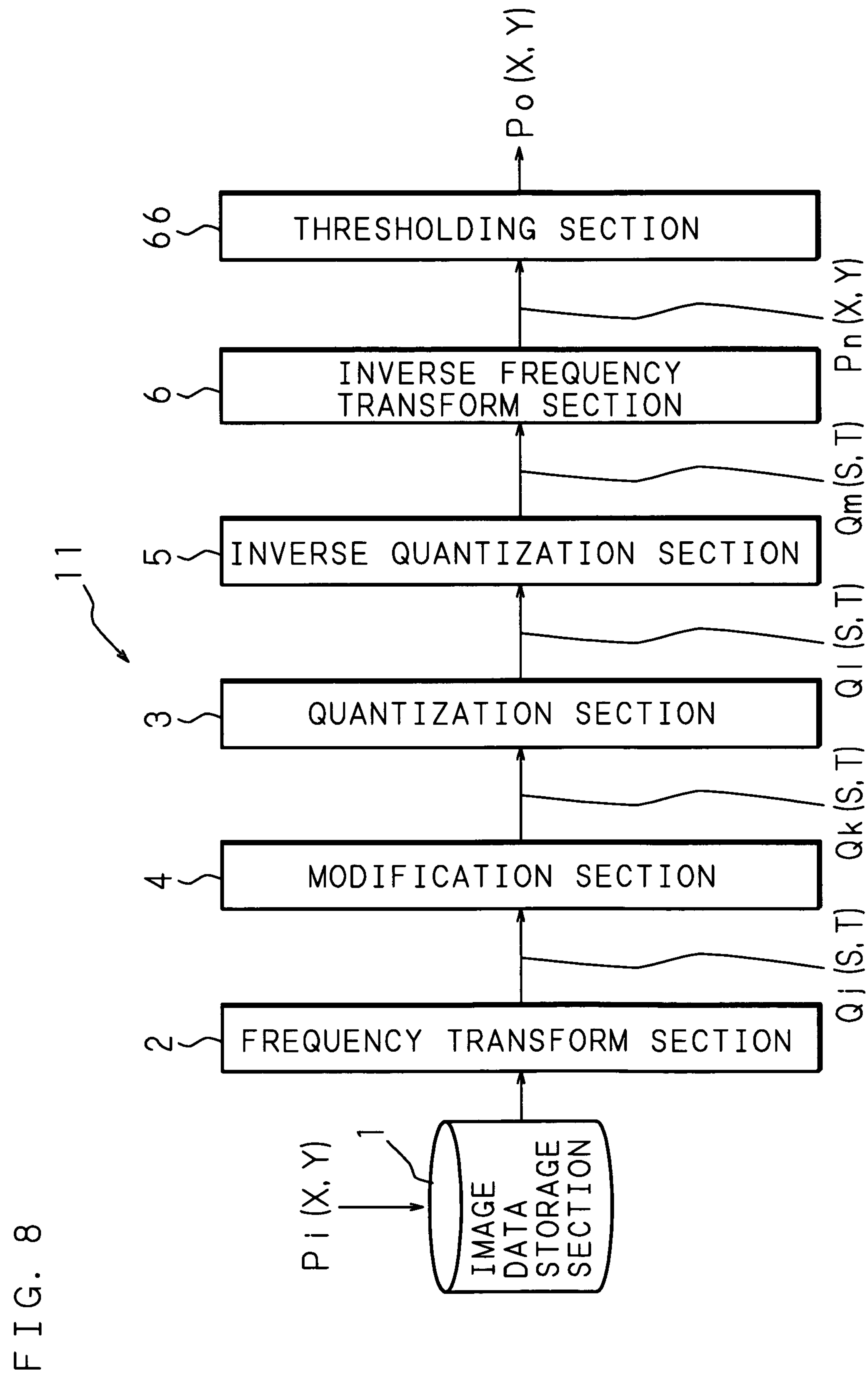
FIG. 8 is a block diagram showing an example of the structure of an image processor (Embodiment 2) of the present invention.

FIG. 8 is a block diagram showing an example of the structure of a grayscale reproduction processor (image processor) 11 of the present invention. Like the grayscale reproduction processor 10 of Embodiment 1 shown in FIG. 3, the grayscale reproduction processor 11 comprises: an image data storage section 1; a frequency transform section 2; a quantization section 3; a modification section 4; an inverse quantization section 5; an inverse frequency transform section 6; and a thresholding section 66. However, the quantization section 3 and modification section 4 are connected in the reverse order to that of Embodiment 1 (FIG. 3).

In Embodiment 2, the modification section 4 changes the modification region of the spatial frequency components (DCT coefficients) Qj (S, T) transformed in the frequency transform section 2. The modification process is almost the same as that in Embodiment 1, but, in Embodiment 2, since quantization has not been performed by the quantization section 3, the DCT coefficients in the modification region are replaced by 0, −64 or 64, for example, for quaternary output. Next, quantization is performed by dividing the modified DCT coefficients Qk (S, T) by a fixed value, for example, 64 in the quantization section 3. Thereafter, the same processes as those in Embodiment 1 are performed.

Either quantization of the DCT coefficients Qj (S, T) obtained in the frequency transform section 2 or changing the modification region may be performed first, but, if quantization is performed first, the DCT coefficients become smaller ($\frac{1}{64}$ in this explanation) and consequently the numerals handled in the modification process are smaller, thereby reducing the memory capacity or processing burden.

Embodiment 3

Figure 9:
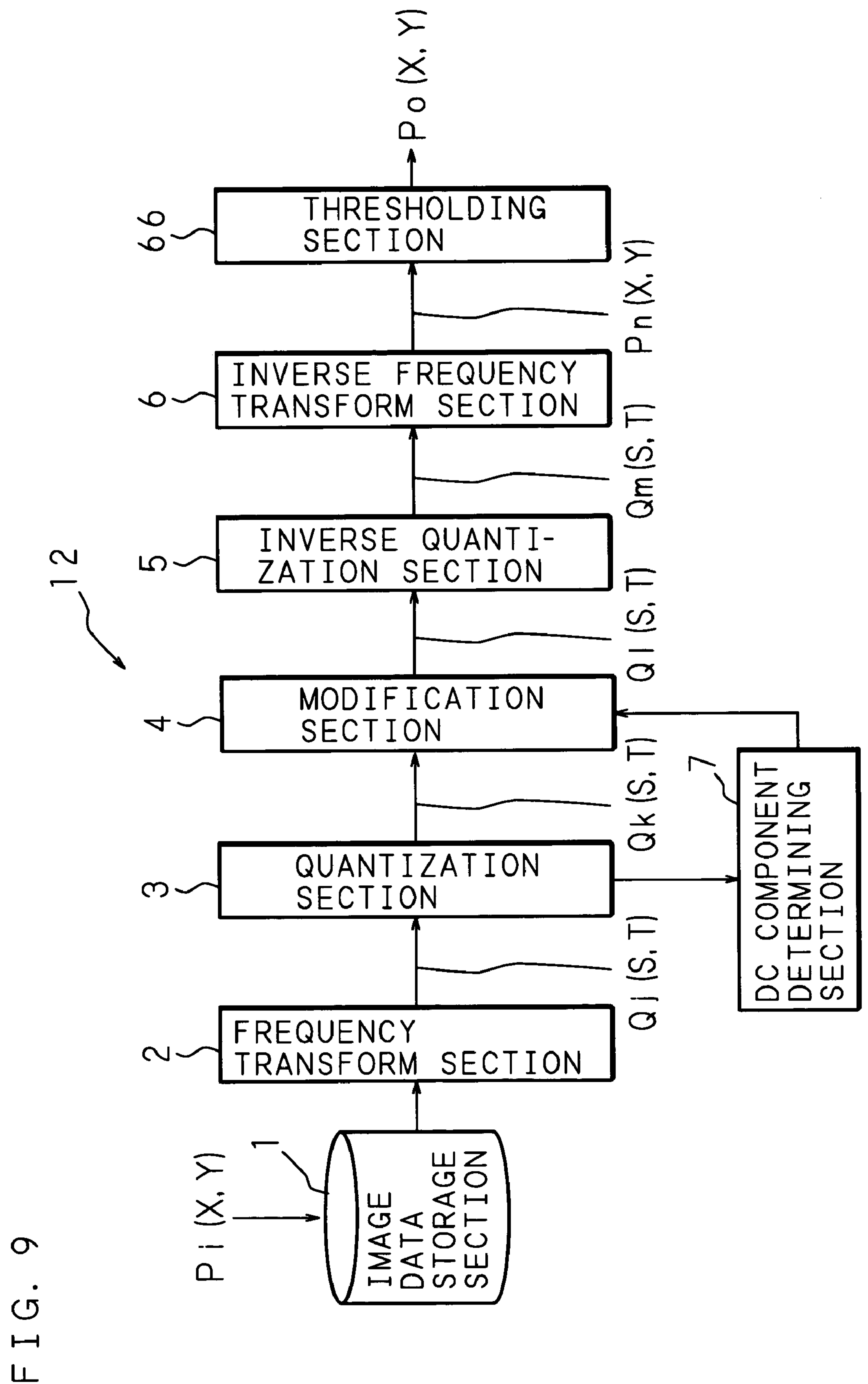
FIG. 9 is a block diagram showing an example of the structure of an image processor (Embodiment 3) of the present invention.

FIG. 9 is a block diagram showing an example of the structure of a grayscale reproduction processor (image processor) 12 of the present invention. Between the quantization section 3 and modification section 4 of the grayscale reproduction processor 10 of Embodiment 1 shown in FIG. 3, the grayscale reproduction processor 12 further comprises a DC component determining section 7 for determining the magnitude of the DC component of the spatial frequency components (DCT coefficients) Qk (S, T) quantized in the quantization section 3 and controlling the number of 0s, or 1s and −1s changed by the modification section 4, based on the magnitude of the DC component. Here, the number of Is and the number of −1s are the same, and, for example, if the number of 1s and −1s is 2, then the number of 1s is 2 and the number of −1s is also 2. For instance, if the number of 1s and −1s to be changed is 2, then two DCT coefficients in the modification region are changed to 1, and other two DCT coefficients are changed to −1.

Figure 10:
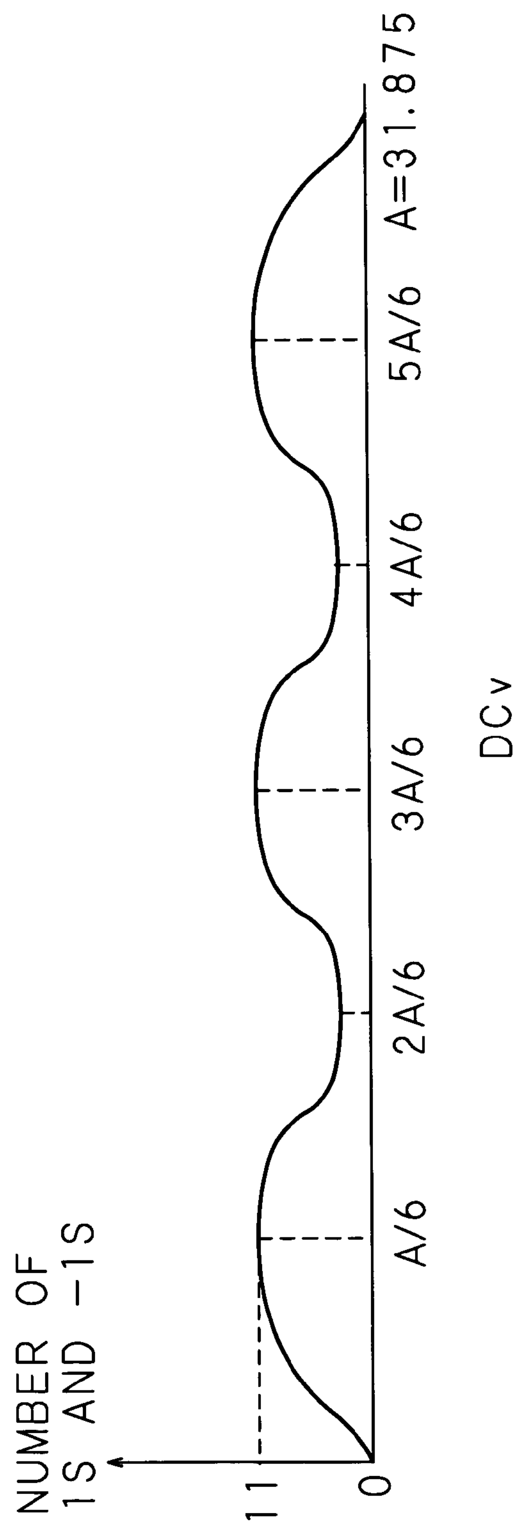
FIG. 10 is a view showing an example of control of the number of 1s and −1s to be changed.

FIG. 10 is a view showing an example of control of the number of 1s and −1s to be changed. FIG. 10 is illustrated by taking a quaternary output as an example. In FIG. 10, the number of 1a and −1s to be changed is controlled within a range of 0 to 11, for example, according to the DC component (DCv). In the example of FIG. 10, the DC component (DCv) is divided into six ranges, and the number of 1s and −1s is increased or decreased within the range of 0 to 11 according to an increase in the DC component in the respective ranges.

More specifically, when the DC component is 0, the number of 1s and −1s is 0, the number of 1s and −1s repeatedly increases or decreases with an increase in the DC component, and the number of 1s and −1s becomes 0 when the DC component is A=31.875. The number of 1s and −1s holds the maximum value (11) when the DC component is A/6, 3A/6 or 5A/6. When the DC component is 2A/6 or 4A/6, the number of 1s and −1s holds the local minimum value, but is not 0.

When the number of 1s and −1s corresponding to the DC component is determined, replacement (changing) is performed in the modification region by the determined number of 1s and the same number of −1s. For example, it is possible to store map data shown in FIG. 10 in the DC component determining section 7, and output the number of 1s and −1s corresponding to the DC component to the modification section 4. The modification section 4 replaces the DCT coefficients corresponding to the outputted number by 1 or −1 (or adds 1 or −1) at random positions in the modification region. It is also possible to calculate the number of 1s and −1s corresponding to the DC component by a function in the DC component determining section 7. The processes performed after the modification process are the same as those in Embodiment 1.

The number of dots in the output image data Po (X, Y) varies depending on the ratio of 1, 0 and −1 placed in the high frequency domain. Lets consider the case where a gradation pattern with 256 gray levels is represented by four levels: 0 dot (dot is not placed), 1-dot size, 2-dot size (two-dots are represented as one dot and the dot diameter is larger than one dot), and 3-dot size (three dots are represented as one dot), instead of binary representation: placing a dot or not placing a dot. The number of dots of the one-dot size is gradually increased from the white region where no dot is placed, usually from the low density side to the high density side, and the 2-dot size starts to be used when saturation is reached. Thus, by continuously switching the dot size up to the 3-dot size, a smooth gradation pattern is represented.

Figure 11:
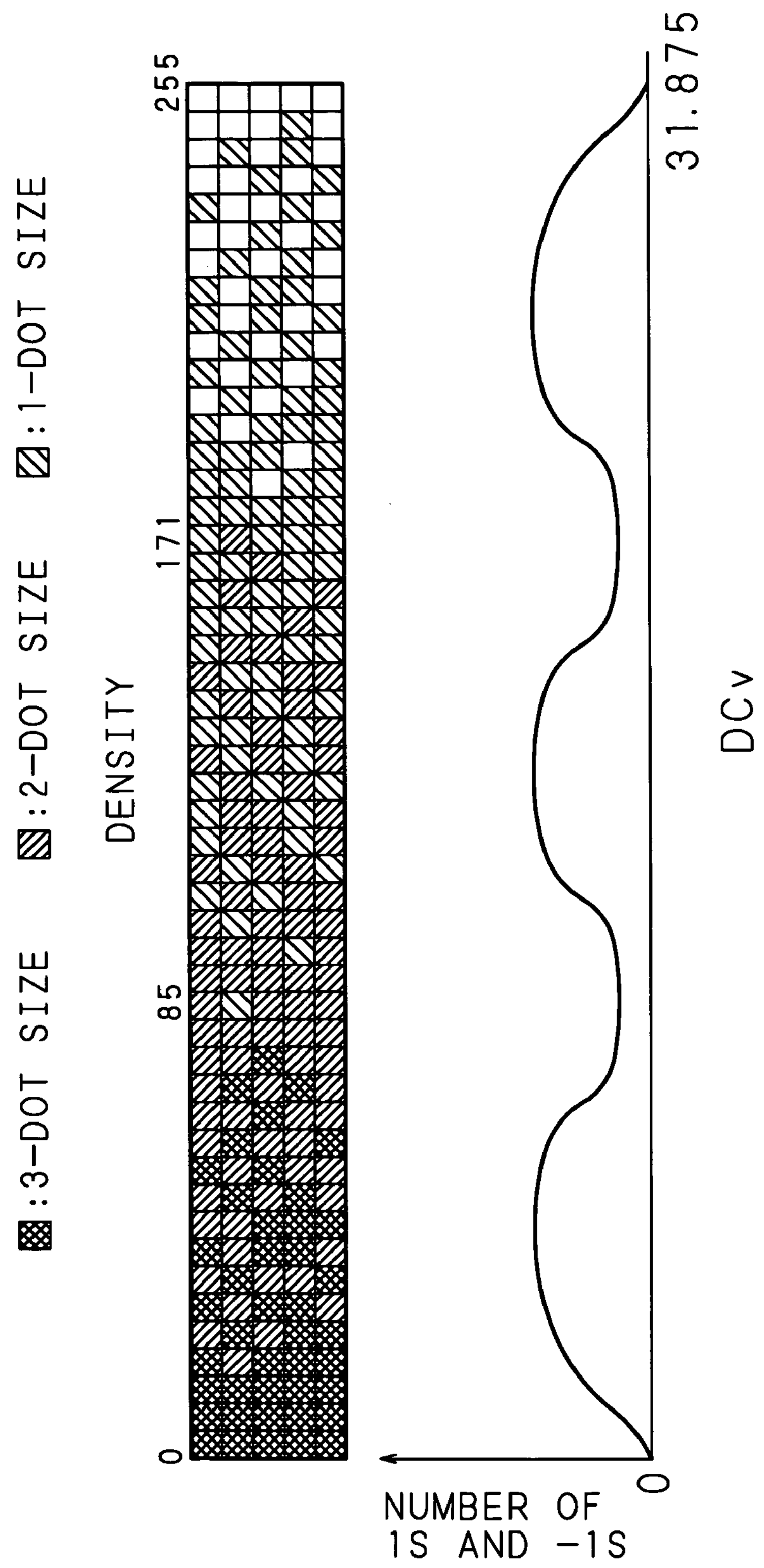
FIG. 11 is a view showing a simulation of gradations using three levels of dot size.

FIG. 11 is a view showing a simulation of gradations using three levels of dot size. Let consider the relationship between the number of 1s and −1s in the modification region of the DCT coefficients Ql (S, T) after the change and the number of dots in the output image data Po (X, Y). In a portion where the number of 1s and −1s is close to the local minimum value, substantially one type of dot size is present, while, in a portion where the number of 1s and −1s is close to the local maximum value, two types of dot sizes are present in substantially the same ratio. During the change in the density value from 0 to 255 (here, 255 is white), there is a switch from a state where almost only the 3-dot size is present to a state where the 3-dot size and 2-dot size are mixed; a switch from a state where almost only the 2-dot size is present to a state where the 2-dot size and 1-dot size are mixed; and a switch from a state where almost only the 1-dot size is present to a state where the 1-dot size and the 0-dot size (no dot is placed) are mixed. If such states are seen in terms of the number of the respective dots, the number of dots increases and decreases alternately in a repeated manner.

In the present invention, the DCT coefficients in the modification region (high frequency domain) are changed, and increasing and decreasing the number of 0s, 1s, −1s of the DCT coefficients (AC components) mean control of the number of dots by controlling the AC components. Therefore, like the gradation pattern shown in FIG. 11, by controlling the number of the DCT coefficients to be changed in the form of sine wave so that the number of DCT coefficients to be changed is gradually increased according to the DC component and then gradually decreased, it is possible to ensure smooth grayscales. In other words, it is possible to smoothly switch the dot sizes of different levels and smooth the whole grayscales.

The DC component represents a region where the density of the image is uniform (for example, the sky without clouds), while the AC components represent detailed brightness and darkness of the image (for example, leaves of a tree in the distance). The DCT transform is a transform of image data into information in frequency space, and represents the DC component, and the degree of brightness and darkness in the vertical direction, brightness and darkness in the horizontal direction and brightness and darkness in the oblique direction (AC components). The AC component of "0" means that there is no corresponding frequency component. Moreover, the AC component is equivalent to the amplitude of each frequency (simple waveform of each cosine function), and indicates which frequency component is strong. Whereas the DC component indicates the average value of the whole waveform, and thus it is possible to prevent the overall amplitude from shifting in one direction by controlling the number of 1s and the number of −1s to be the same.

Embodiment 4

Figure 12:
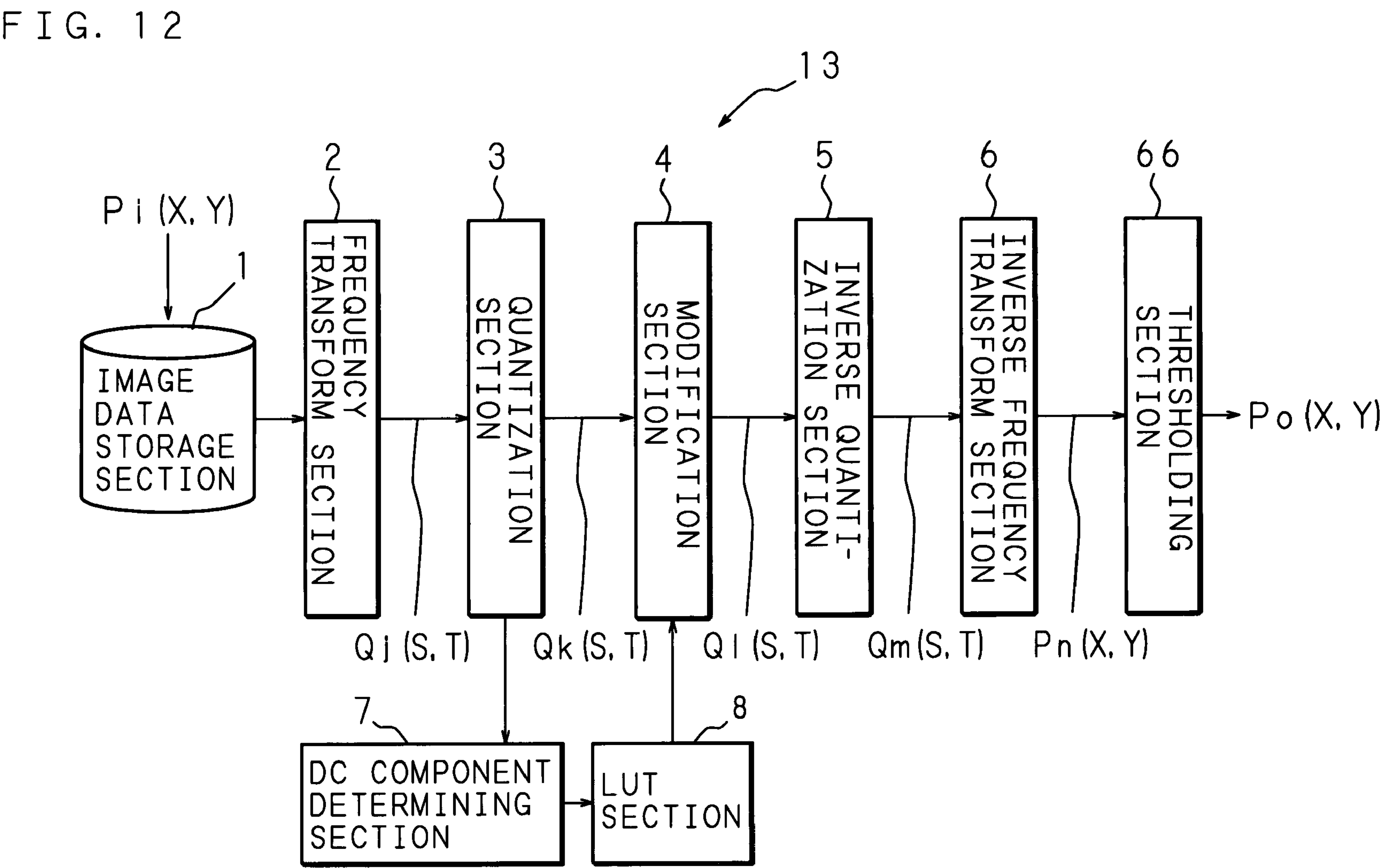
FIG. 12 is a block diagram showing an example of the structure of an image processor (Embodiment 4) of the present invention.

FIG. 12 is a block diagram showing an example of the structure of a grayscale reproduction processor (image processor) 13 of the present invention. Between the modification section 4 and DC component determining section 7 of the grayscale reproduction processor 12 of Embodiment 3 shown in FIG. 9, the grayscale reproduction processor 13 further comprises an LUT section 8 storing a table (LUT: Look Up Table) that is the basis of changing the DCT components in the modification region).

FIGS. 13A, 13B and 13C are views showing an example of changing DCT coefficients using an LUT. Here, the modification region is the same as that in FIG. 4. In the LUT section 8, a plurality of LUTs in which the modification values (0, 1, −1) of the respective portions to be changed in the modification region are stored. For example, a plurality of kinds of LUTs which differ in the number of 0s, or 1s and −1s are stored. The LUT section 8 selects an LUT corresponding to the number of 1s and −1s according to the DC component, based on the determination result in the DC component determining section 7, and sends the selected LUT to the modification section 4, so that the DCT coefficients are changed in the modification section 4 based on the LUT. The DCT coefficients can be changed by replacing the modification region of the quantized DCT coefficients Qk (S, T) with the values in the modification region of the LUT, or adding the values in the LUT to the DCT coefficients Qk (S, T).

According to Embodiment 4, the occurrence of tone gap, texture and worms can be reduced, and optimum modification values in the modification region can be preset using the LUT, thereby improving the output image reproducibility. When the DCT coefficients in the high frequency domain are changed by presetting modification values to obtain balanced dot reproducibility, even if binarization or quaternarization is performed using threshold values, it is possible to obtain a binary image or a quaternary image with good grayscales as a whole. Moreover, since the LUT is used, it is possible to easily and quickly determine optimum modification values.

Embodiment 5

FIG. 14 is a block diagram showing an example of the structure of a grayscale reproduction processor (image processor) 14 of the present invention. The grayscale reproduction processor 14 has almost the same structure as the grayscale reproduction processor 13 of Embodiment 4 shown in FIG. 12, but it comprises a blue noise LUT section 9 storing an LUT based on blue noise (hereinafter referred to as the blue noise LUT) in place of the LUT section 8.

Blue noise is pattern data having a spatial frequency which is hardly perceived by human eyes: The vision of human has almost no sensitivity at frequencies higher than a certain spatial frequency, and MTF (Modulation Transfer Function) of the visual system is known as one kind of low-pass filter (see, for example, "High Quality Image Processing for Ink Jet Printers", T. Makita, Journal of the Image Society of Japan, 2001, Vol. 40, No. 3, p. 239-243). By adjusting pseudo-random patterns and generating a pattern in which the main components of the spatial frequency are distributed in a band not lower than the cutoff frequency of the MTF of the visual system, blue noise is obtained.

By replacing such blue noise with the spatial frequency component and changing the DCT coefficients of the image data by using the replaced spatial frequency component, it is possible to improve the dispersion of dots in a highlighted area where the dot density is not dense. Moreover, it is possible to improve the texture in the intermediate density region.

Figure 15:
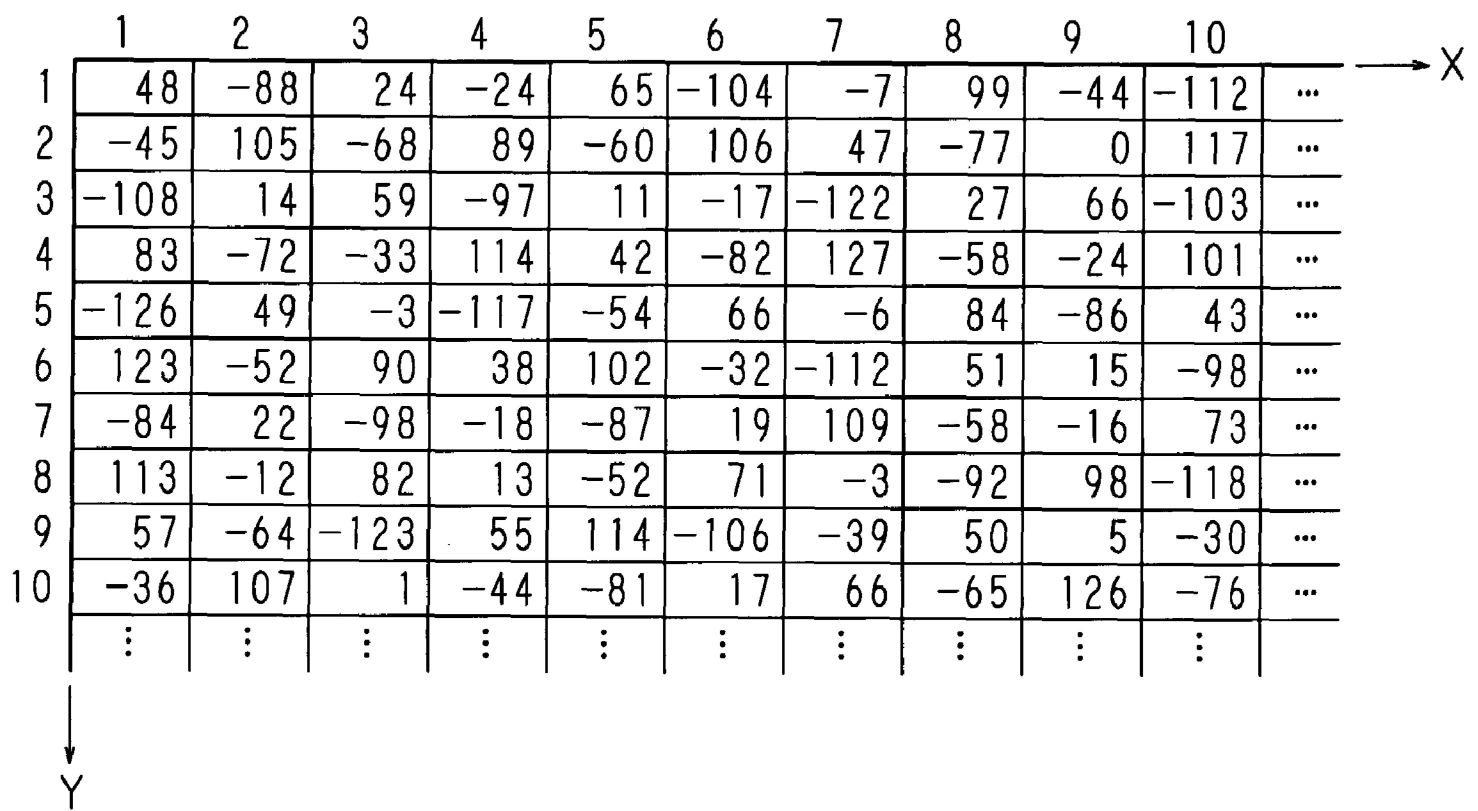
FIG. 15 is an view showing an example of blue noise mask.

Blue noise is usually given as a 256×256 data matrix, and this data matrix is called a blue noise mask. FIG. 15 is a view showing an example of the blue noise mask used for binary output. The data stored in the blue noise LUT section 9 is a data table prepared by performing a DCT transform on the blue noise data of FIG. 15 and dividing the data by a fixed value so that the maximum value of the absolute value is about 1.

FIGS. 16A, 16B and 16C are views showing examples of data tables (blue noise LUT) optimized by performing a DCT transform on the blue noise mask shown in FIG. 15 and further dividing the data by a fixed value. The blue noise data optimized after the DCT transform has values in the high frequency domain. In Embodiment 5, an 8×8 block is used as a standard unit, a total of 64 blocks including 8 blocks in the horizontal direction and 8 blocks in the vertical direction are treated as one group, and patterns of the same group are repeated. When the size of a blue noise mask is 64×64 (8 blocks×8 blocks), LUT data for a total of 65 blocks including blue noise LUT data for 64 blocks and LUT data where 8×8 data is all "0" are stored in the blue noise LUT section 9.

Figure 17:
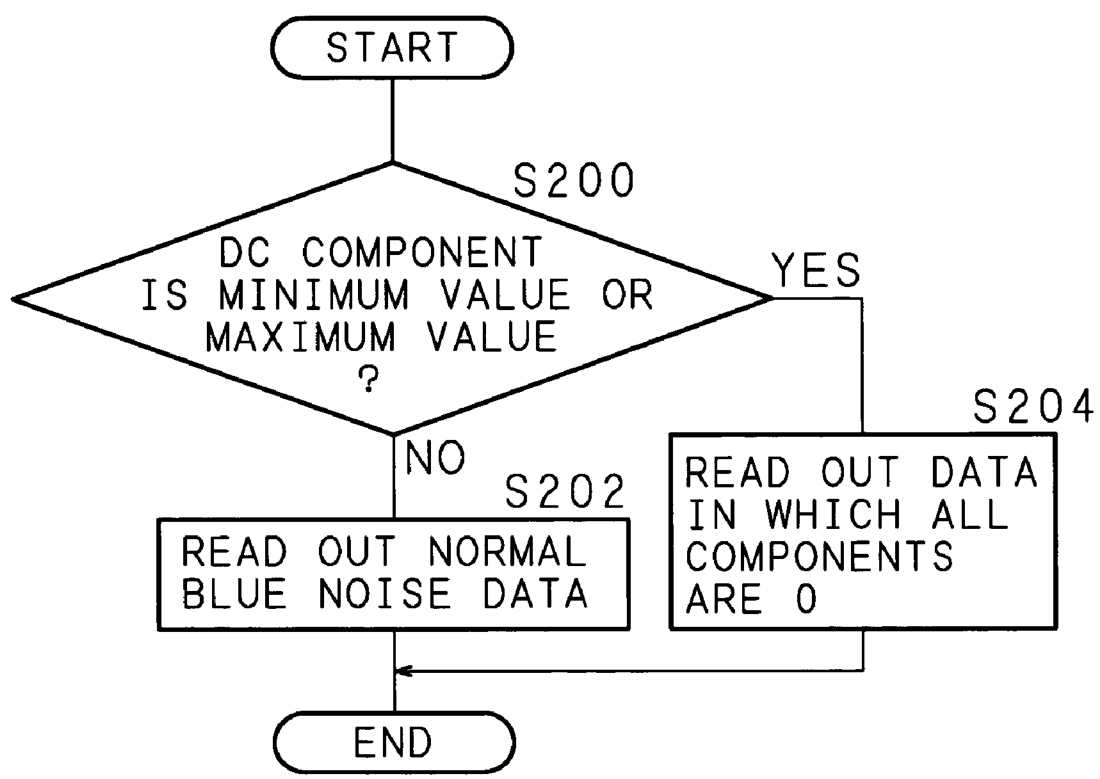
FIG. 17 is a flowchart showing an example of the procedure of modification process using blue noise LUT.

The DCT coefficients Qk (S, T) quantized in the quantization section 3 are processed on a block-by-block basis, and the DCT coefficients are changed based on the blue noise LUT in the modification section 4. This modification process is the same as the above-mentioned modification process using the LUT section 8 (FIG. 12), but, if blue noise is used as data of the LUT, the DC component determining section 7 determines whether or not the DC coefficient holds the minimum value or the maximum value. FIG. 17 is a flowchart showing an example of the procedure of modification process using the blue noise LUT. If the DC component determining section 7 determines that the DC component is not the minimum value or the maximum value (step S200: NO), the blue noise LUT section 9 outputs the blue noise LUT of the selected block to the modification section 4 (step S202) similarly to the above-mentioned LUT section 8 (FIG. 12), for example. If the DC component determining section 7 determines that the DC component is the minimum value or the maximum value (step S200: YES), the blue noise LUT section 9 outputs to the modification section 4 an LUT in which all components are "0" among the stored LUTs (step S204).

In the case of blue noise, the low frequency components are almost 0 as described above and the high frequency components are the main components, and therefore it is not necessary to separate the data into a modification region where DCT coefficients are changed and a non-modification region where DCT coefficients are not changed, and it is possible to add blue noise data to the DCT coefficients in one 8×8 block. In other words, in this case, a predetermined frequency domain (modification region) means the whole one block. Besides, since blue noise data is added, the original data is not lost, and deterioration of the image can be reduced. The processes to be performed after changing the DCT coefficients are the same as those in Embodiment 4.

Since the blue noise which is hardly perceived by human is transformed into spatial frequency components and the spatial frequency components (DCT coefficients) in the high frequency domain of the image data are changed using the transformed spatial frequency components, it is possible to improve the dispersion of dots in a highlighted area of the output image, or the texture in an intermediate density region. When the DCT coefficients in the high frequency domain are changed using the normalized blue noise data, even if binarization, quaternarization or the like is performed using threshold values, it is possible to obtain a binary image, a quaternary image, etc. with good grayscales as a whole.

In the modification section for changing the above-mentioned spatial frequency component, the respective DCT coefficients in the modification region are replaced by 0, 1 or −1, or 0, 1 or −1 are added, but the values are not limited to integers such as 0, 1, or −1, and it may be possible to use real numbers of decimal fractions. FIGS. 18A, 18B and 18C are views showing examples of blue noise LUT using real numbers of decimal fractions. Since the amount of lost information can be reduced by using real numbers of decimal fractions, the DCT coefficients in the modification region can be changed more precisely compared to integers, thereby providing a smoother grayscale reproduced image. Thus, an image with the highest quality can be obtained by using real numbers of decimal fractions as the quantized values of spatial frequency components (DCT coefficients) and the values of spatial frequency components to be changed (modification values) and by adding blue noise data to the whole one block as the modification process.

Embodiment 6

Figure 19:
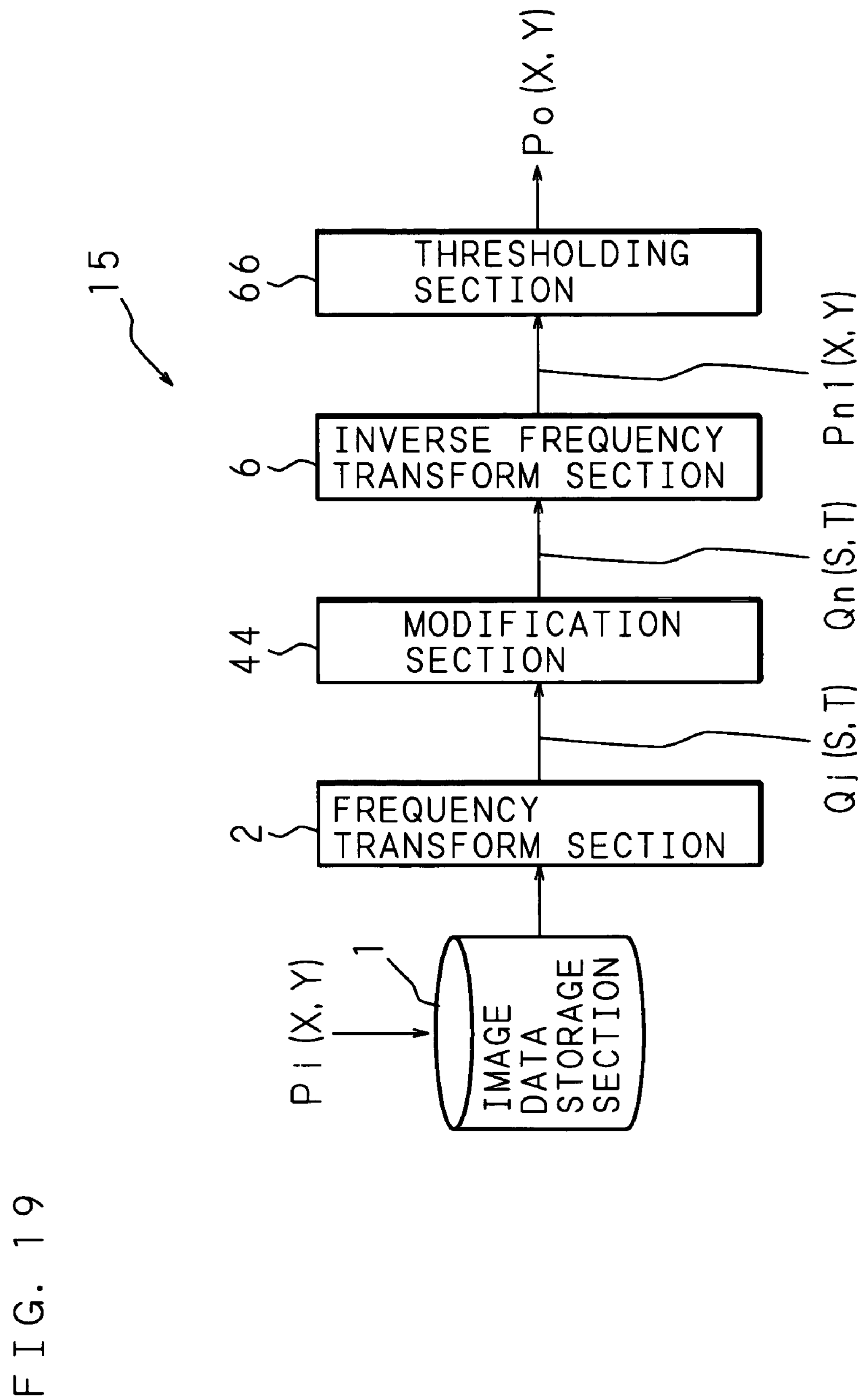
FIG. 19 is a block diagram showing an example of the structure of an image processor (Embodiment 6) of the present invention.

FIG. 19 is a block diagram showing an example of the structure of a grayscale reproduction processor (image processor) 15 of the present invention. The grayscale reproduction processor 15 comprises: an image data storage section 1 for storing input image data Pi (X, Y); a frequency transform section 2 for transforming the input image data Pi (X, Y) into spatial frequency components Qj (S, T); a modification section 44 for changing a part of the spatial frequency components Qj (S, T); an inverse frequency transform section 6 for performing an inverse frequency transform of the modified spatial frequency components Qn (S, T); a thresholding section 66 for thresholding the inverse-frequency-transformed image data Pn1 (X, Y); and a controller (not shown) for controlling these sections, and outputs thresholded output image data Po (X, Y).

The grayscale reproduction processor 15 of FIG. 19 has a structure obtained by removing the quantization section 3 and inverse quantization section 5 from the grayscale reproduction processor 10 of Embodiment 1 (FIG. 3). The basic operations of the image data storage section 1, frequency transform section 2, modification section 44, inverse frequency transform section 6 and thresholding section 66 are substantially the same as in Embodiment 1. Moreover, the number of gray levels in the input image data Pi (X, Y) and the number of gray levels in the output image data Po (X, Y) are also the same as those in Embodiment 1.

The modification section 44 changes the data Qj (S, T) which have been frequency transformed in the frequency transform section 2 on a block-by-block basis, one block being composed of 8×8 pixels, for example. A change is not made to all DCT coefficients within one block, but is made to only a part of the DCT coefficients among the 8×8 DCT coefficients within one block. For example, the DCT coefficients in the modification region shown in FIG. 4 are changed, but the modification region is not limited to this region and may be set to other region other than the DC component. The setting pattern of the modification region is stored in the modification section 44 or the control section (not shown), for example, in advance.

In Embodiment 6, however, since the quantization section 3 is not provided, the modification section 44 replaces (changes) a part of the frequency transformed DCT coefficients Qj (S, T) corresponding to the modification region by 0, 64 or −64, for example. FIGS. 20A and 20B are views showing an example of changing DCT coefficients. Similarly to Embodiment 1, replacement (changing) of the DCT coefficients in the modification region may be implemented by, for example, comparing whether each of the DCT coefficient Qj (S, T) after the frequency transform is larger or smaller than two threshold values, Vth1', Vth2' (here, Vth1'>Vth2'), and replacing the DCT coefficients by 0, 64 or −64 according to the comparison results.

Figure 21:
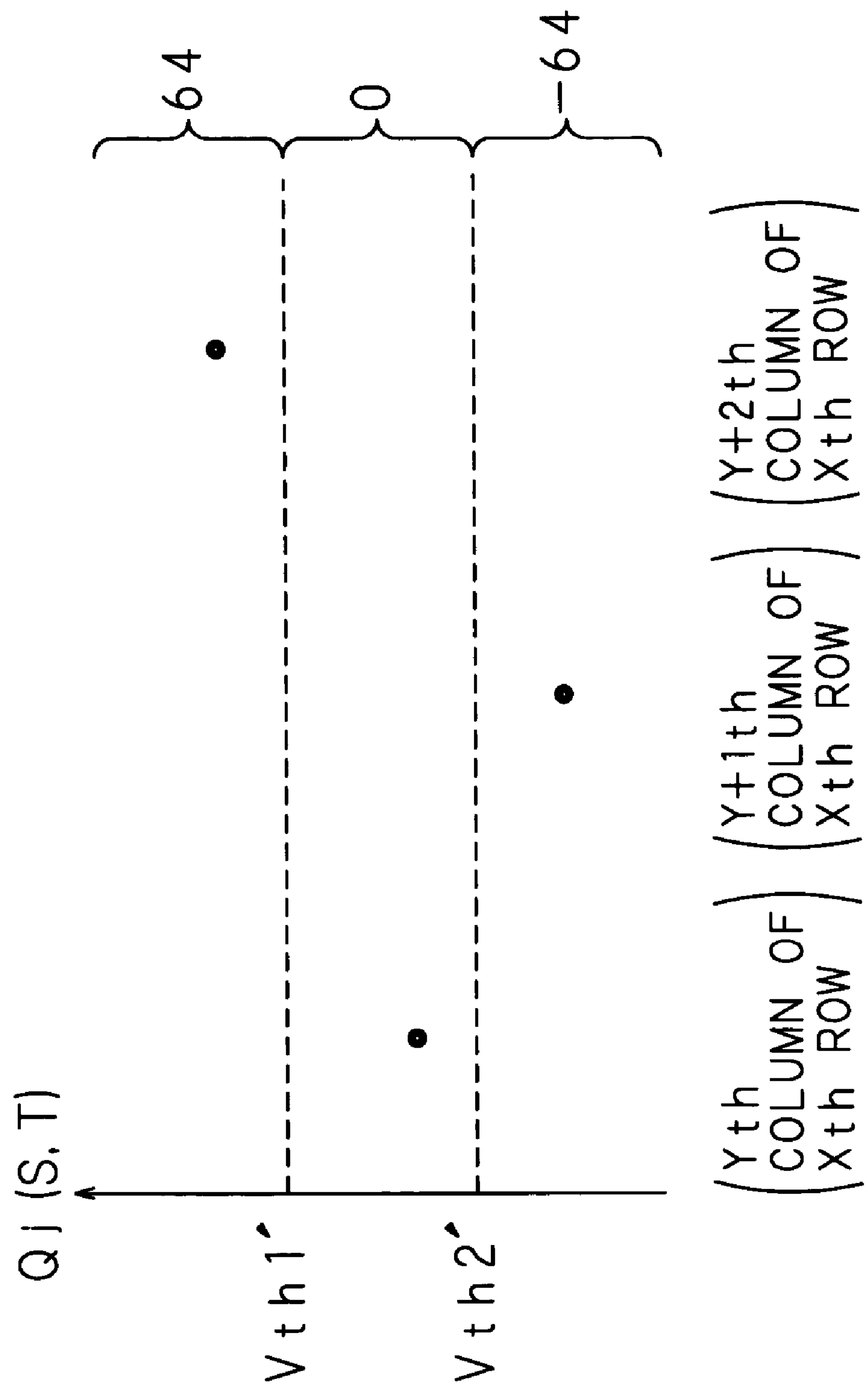
FIG. 21 is a view showing an example of modification values of DCT coefficients based on comparison with threshold values.

FIG. 21 is a view showing an example of the modification values of the DCT coefficients based on the comparison with the threshold values. FIG. 21 shows an example of the modification values of the DCT coefficients in the Yth column, Y+1th column and Y+2th column of the Xth row in a block, wherein the DCT coefficient Qj (S, T) is replaced by −64 when it is not larger than Vth2', the DCT coefficient Qj (S, T) is replaced by 64 when it is not smaller than Vth1', and the DCT coefficient Qj (S, T) is replaced by 0 when it is between Vth1' and Vth2'. The respective blocks are rarely changed in the same pattern, but they are changed randomly (irregularly). The modification section 44 sends the DCT coefficients Qn (S, T) after the modification process to the inverse frequency transform section 6.

The inverse frequency transform section 6 performs an inverse frequency transform on the DCT coefficients Qn (S, T) changed in the modification section 44 so as to transform them into density domain data (image data). A two-dimensional inverse DCT transform performs the inverse process of DCT transform. The thresholding section 66 transforms the density domain data (image data) Pn1 (X, Y) received from the inverse frequency transform section 6 into multi-value density data (output image data) Po (X, Y) by using a plurality of threshold values in the same manner as in Embodiment 1. For example, in the case of quaternary output, the transform is performed using three threshold values as follows:

if 0<Pn1 (X, Y)≦42, then Po (X, Y)=0, if 42<Pn1 (X, Y)≦127, then Po (X, Y)=85, if 127<Pn1 (X, Y)≦212, then Po (X, Y)=171, and if 212<Pn1 (X, Y)≦255, then Po (X, Y)=255.

When thresholding a two-dimensional image, a conventional thresholding process in which thresholding is repeated using matrices of the same pattern is not executed, but noise is added by changing the spatial frequency components (DCT coefficients), and therefore conventional problems such as occurrence of worms, texture and tone gap can be reduced. Further, since the quantization process and inverse quantization process (bit shift processing in two steps),are omitted, the processing time can be shortened. Note that, since the quantization process and inverse quantization process are omitted, a quantization error does not occur and the image quality before the thresholding process is improved, and consequently it is possible to reduce the processing time without deteriorating the image quality of the output image data Po (X, Y).

Embodiment 7

Although the above description has explained an example in which the quantization section 3 and inverse quantization section 5 are removed from the grayscale reproduction processor 10 of Embodiment 1, it may also be possible to remove the quantization section 3 and inverse quantization section 5 from the grayscale reproduction processor 12 of Embodiment 3 comprising the DC component determining section 7; remove the quantization section 3 and inverse quantization section 5 from the grayscale reproduction processor 13 of Embodiment 4 comprising the DC component determining section 7 and LUT section 8; or remove the quantization section 3 and inverse quantization section 5 from the grayscale reproduction processor 15 of Embodiment 5 comprising the DC component determining section 7 and blue noise LUT section 9.

Figure 22:
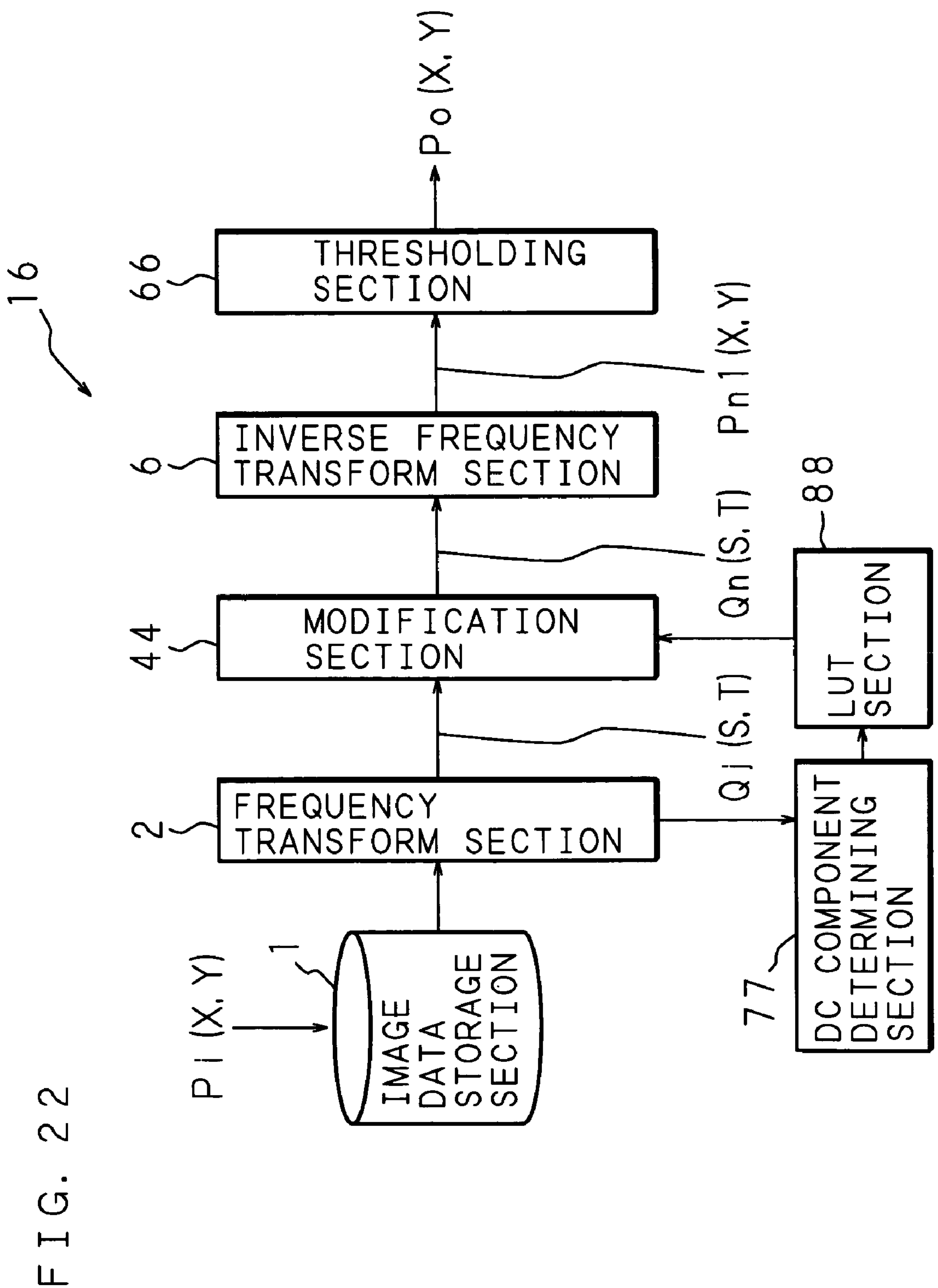
FIG. 22 is a block diagram showing an example of the structure of an image processor (Embodiment 7) of the present invention.

FIG. 22 is a block diagram showing an example of the structure of a grayscale reproduction processor (image processor) 16 of the present invention. The grayscale reproduction processor 16 is obtained by removing the quantization section 3 and inverse quantization section 5 from the grayscale reproduction processor 13 of Embodiment 4 (FIG. 12). Since the quantization section and inverse quantization section are not provided, a DC component determining section 77 is connected to the frequency transform section 2. The DC component determining section 77 receives the DC component, etc. of the DCT coefficients Qj (S, T) from the frequency transform section 2, and determines the number of 0s or 64s and −64s. An LUT section 88 stores, for example, LUTs prepared by changing 1 and −1 in the LUT shown in FIG. 13C to 64 and −64. The modification section 44 changes (by replacement or addition) the DCT coefficients Qj (S, T) received from the frequency transform section 2, based on the LUT received from the LUT section 88.

Here, it is possible to obtain an image with the highest quality by adding normalized blue noise data including a decimal point to the high frequency components of the DCT coefficients, and it is possible to shorten the processing time without deteriorating the image quality because the quantization process and inverse quantization process are not performed. Thus, it can be said that a mode in which the LUT section (blue nose LUT section) 88 of FIG. 22 stores normalized blue noise data including a decimal point is the best mode.

Embodiment 8

Figure 23:
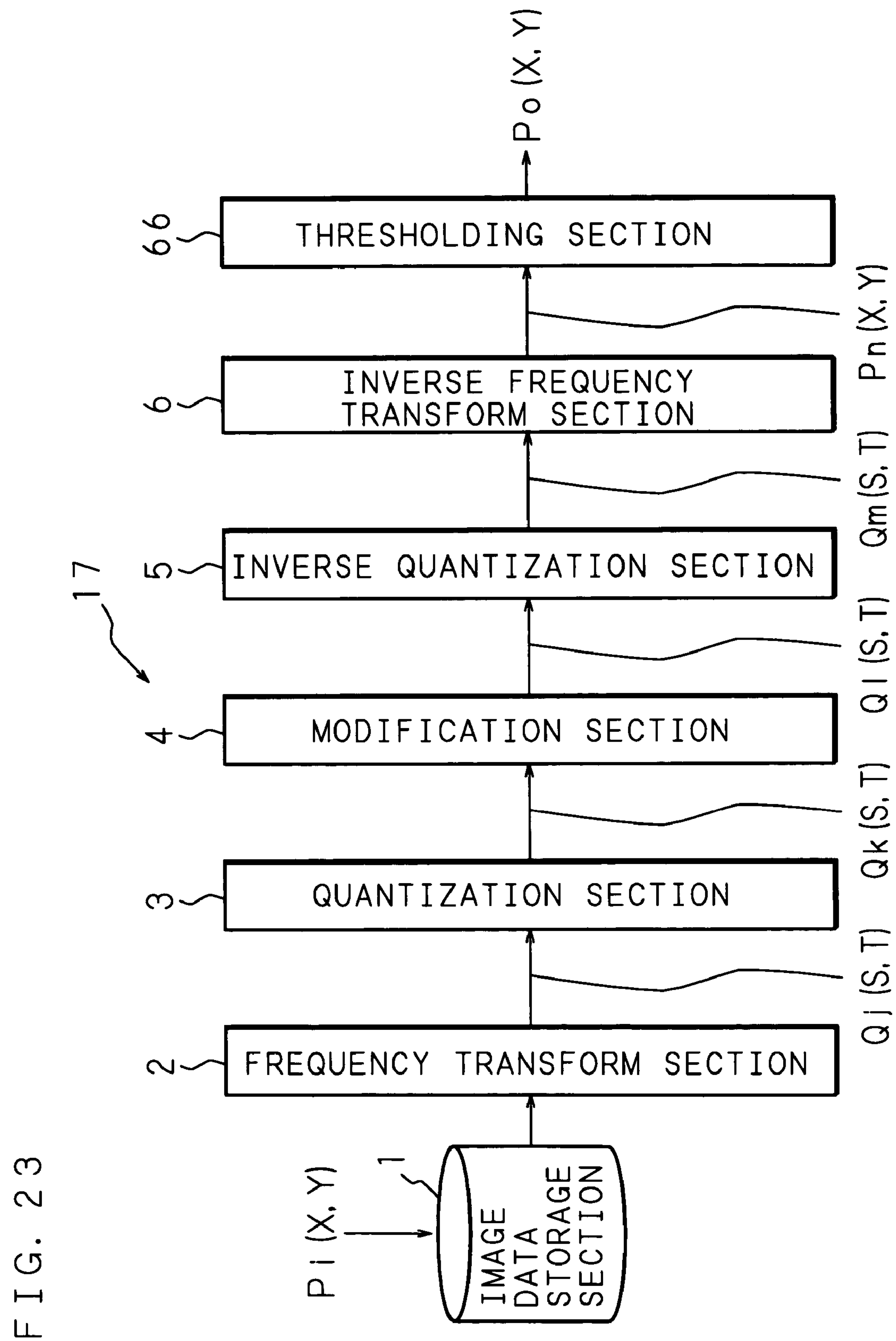
FIG. 23 is a block diagram showing an example of the structure of an image processor (Embodiment 8) of the present invention.

FIG. 23 is a block diagram showing an example of the structure of a grayscale reproduction processor (image processor) 17 of the present invention. Similarly to Embodiment 1 shown in FIG. 3, the grayscale reproduction processor 17 comprises an image data storage section 1; a frequency transform section 2; a quantization section 3; a modification section 4; an inverse quantization section 5; an inverse frequency transform section 6; and a thresholding section 66. Note that it is not necessarily to provide the quantization section 3 and inverse quantization section 5, but, as mentioned above, the processing burden of the grayscale reproduction processor 17 is reduced by quantizing the spatial frequency components Qj (S, T).

In Embodiment 8, the input image data Pi (X, Y) is color image data composed of image data Pic (X, Y) of the C component of CMYK (C: cyan, M: magenta, Y: Yellow, K: black) color components, image data Pim (X, Y) of the M component, image data Piy (X, Y) of the Y component, and image data Pik (X, Y) of the K component. For the sake of simplifying the explanation, each of the input image data Pic (X, Y), Pim (X, Y), Piy (X, Y) and Pik (X, Y) is represented by Pi (X, Y) in the following explanation.

The spatial frequency components Qj (S, T) are composed of Qjc (S, T), Qjm (S, T), Qjy (S, T) and Qjk (S, T). Similarly, the quantized frequency components Qt (S, T) are composed of Qkc (S, T), Qkm (S, T), Qky (S, T) and Qkk (S, T); the partly changed spatial frequency components Ql (S, T) are composed of Qlc (S, T), Qlm (S, T), Qly (S, T) and Qlk (S, T); the inverse-quantized spatial frequency components Qm (S, T) are composed of Qmc (S, T), Qmm (S, T), Qmy (S, T) and Qmk (S, T); the inverse frequency-transformed image data Pn (X, Y) is composed of Pnc (X, Y), Pnm (X, Y), Pny (X, Y) and Pnk (X, Y); and the thresholded output image data Po (X, Y) is composed of Poc (X, Y), Pom (X, Y), Poy (X, Y) and Pok (X, Y).

The modification section 4 replaces (changes) each of the DCT coefficients Qk (S, T) in the modification region by, for example, 0, 1 or −1. As the method of replacing (changing) the DCT coefficients Qk (S, T) in the modification region, the modification section 4 compares whether each of the DCT coefficients Qk (S, T) after the frequency-transform and quantization is larger or smaller than two threshold values, Vth1, Vth2 (here, Vth1>Vth2), and replaces them by 0, 1 or −1 according to the comparison results. The modification section 4 replaces the DCT coefficient Qk (S, T) by −1 when the Qk (S, T) is not larger than Vth2, replaces the DCT coefficient Qk (S, T) by 1 when the Qk (S, T) is not smaller than Vth1, and replaces the DCT coefficient Qk (S, T) by 0 when the Qk (S, T) is between Vth1 and Vth2. Note that the modification section 4 performs the modification process under different conditions for the DCT coefficients Qkc (S, T) of the C component, the DCT coefficients Qkm (S, T) of the M component, the DCT coefficients Qky (S, T) of the Y component, and the DCT coefficients Qkk (S, T) of the K component.

More specifically, for example, for the DCT coefficients Qkc (S, T) in the modification region of the C component, the modification section 4 performs the following modification process:

if Qkc (S, T)≦Vth2, then Qkc (S, T) is replaced by −1, if Vth2<Qkc (S, T)<Vth1, then Qkc (S, T) is replaced by 0, and if Qkc (S, T)≧Vth1, then Qkc (S, T) is replaced by 1.

On the other hand, for the DCT coefficients Qkm (S, T) in the modification region of the M component, the modification section 4 performs the following modification process:

if Qkm (S, T)≦Vth2, then Qkm (S, T) is replaced by 1, if Vth2<Qkm (S, T)<Vth1, then Qkm (S, T) is replaced by 0, and if Qkm (S, T)≧Vth1, then Qkm (S, T) is replaced by −1.

The modification section 4 sends the DCT coefficients Ql (S, T) after the modification process to the inverse quantization section 5 on a color-by-color basis. The respective blocks are rarely changed in the same pattern, but they are changed randomly. The operations of the inverse quantization section 5 and thresholding section 66 are the same as those in Embodiment 1.

The grayscale reproduction processor 17 changes the input image data Pi (X, Y) stored in the image data storage section 1 into the frequency domain, performs an inverse frequency transform after changing a part of the data, and finally generates the output image data Po (X, Y) in which the number of gray levels of all pixels has been reduced to four levels, for example, by thresholding.

In the grayscale reproduction processor 17, since the modification section 4 changes the DCT coefficients in the modification region of the DCT coefficients Qkc (S, T) of the C (cyan) component and that of the DCT coefficients Qkm (S, T) of the M (magenta) component quantized in the quantization section 3 so that their signs are opposite, the positions of dots in the image based on the image data generated by the inverse quantization section 5, inverse frequency transform section 6 and thresholding section 66 do not overlap. Reversing the sign of the DCT coefficient of the frequency component, that is, giving a negative amplitude, is equivalent to a shift of the phase of the frequency component by a half wavelength, and is also equivalent to a shift of the phase by a half wavelength in the positions of dots appearing in an actual image. In particular, for high frequencies, a shift of the phase by a half wavelength means that the position of a dot to be formed shifts to the position of a neighboring pixel.

Figure 24A:
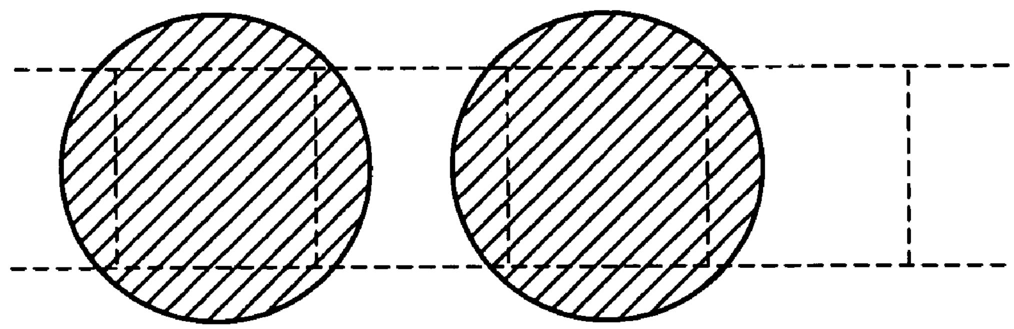
FIGS. 24A and 24B are views showing examples of dot patterns to be formed.
Figure 24B:
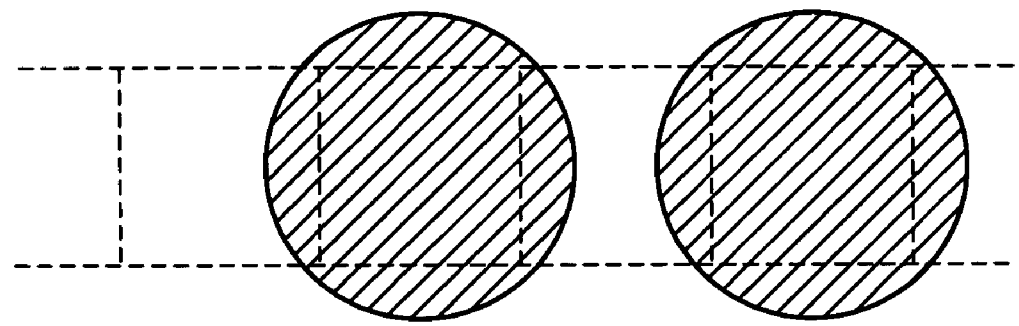

More specifically, for example, in the grayscale reproduction processor 17, if the modification section 4 changes a certain high frequency component to 1, the inverse quantization section 5, inverse frequency transform section 6 and thresholding section 66 generate image data and, for example, an electrophotographic type image forming apparatus forms an image based on the generated image data, then the formed image has the dot patterns shown in FIG. 24A. For the sake of simplifying the explanation, FIGS. 24A and 24B show linearly arranged dot patterns, and one circle with hatching represents one dot. In such image data, if the modification section 4 changes a certain high frequency component to −1 instead of 1 and the inverse quantization section 5, inverse frequency transform section 6 and thresholding section 66 generate image data, then an image with dots whose position is shifted to the position of adjacent pixels is formed as shown in FIG. 24B.

Accordingly, as mentioned above, in the image based on the output image data Poc (X, Y) and Pom (X, Y) generated by changing the DCT coefficients Qkc (S, T) and Qkm (S, T) of cyan (C component) and magenta (M component) to modification values of opposite sign and shifting the phase of the frequency of the dots of the respective color components by a half wavelength, at a pixel position where a dot is not present in the image of one color component (for example, the cyan image), a dot of the image of the other color component (for example, the magenta image) appears. Conversely, at a pixel position where a dot of the image of one color component is present, a dot of image of the other color component tends not to be formed, and thus it is possible to easily realize an image (dot-off-dot image) in which overlapping of dots rarely occurs between cyan and magenta and it is possible to generate a smooth image without graininess.

In the above-described example, although the modification process for the C component and M component is explained, the present invention is also effective for other colors. FIGS. 25A, 25B, 25C and 25D are views showing the modification values for the respective C, M, Y and K components. Note that FIG. 25A shows the DCT coefficients Qlc (S, T) of the C component after the change, FIG. 25B shows the DCT coefficients Qlm (S, T) of the M component after the change, FIG. 25C shows the DCT coefficients Qly (S, T) of the Y component after the change, and FIG. 25D shows the DCT coefficients Qlk (S, T) of the K component after the change.

In such a modification process, as shown in FIGS. 25B and FIG. 25D, the DCT coefficients Qlm (S, T) and Qlk (S, T) of the M component and K component are changed to modification values of mutually opposite signs, and, as shown in FIGS. 25A and FIG. 25C, the C component and the Y component are changed to mutually different values. When such a modification process is performed, the image based on the generated image data becomes an image with the strongest dot-off-dot effect in which the magenta dot and the black dot do not overlap. Besides, it is possible to expect some dot-off-dot effect between yellow dots and cyan dots, for example, though the effect is not as great as that for magenta and black.

Note that it is most effective to apply Embodiment 8 by reversing the sign between the most effective colors, and, in particular, when forming an image using cyan, magenta and yellow, relatively rough control is necessary for controlling overlapping of yellow dots and dots of other color components, and therefore it is most effective to implement Embodiment 8 as control of overlapping of a cyan dot and a magenta dot. On the other hand, in the above example, although the signs to be made opposite are fixed for cyan and magenta, or magenta and black, it is also possible and more preferable, from the point of view of high image quality, to vary the combinations according to the color characteristics or density characteristics of inputted pixels. For example, in a light green portion, since only cyan and yellow are used, it is most effective to reverse the signs of frequency components to be added to cyan and yellow by Embodiment 8. Further, in the case where black is mixed in dark green, it is also effective to reverse the signs of frequency components to be added to black and cyan by the present invention.

The thresholding section 66 of Embodiment 8 does not perform a conventional thresholding process in which thresholding is repeated using matrices of the same pattern, but performs the modification process for spatial frequency components (DCT coefficients) in the modification section 4, and therefore the conventional problem such as occurrence of tone gap can be solved.

As a method of replacing (changing) the DCT coefficients Qk (S, T) in the modification region, the above-described example of Embodiment 8 adopts a method in which the DCT coefficients Qk (S, T) are replaced by 0, 1 or −1 according to the results of comparison between each of the DCT coefficients Qk (S, T) and two threshold values, Vth1 and Vth2. However, as other method, for example, it may be possible to determine the magnitude of the DC component of the quantized spatial frequency components (DCT coefficients) Qk (S, T) and replace the Qk (S, T) by 0, 1 or −1 based on the magnitude of the DC component. It may also be possible to store modification values (0, 1, −1) corresponding to the respective portions to be changed in the modification region in a plurality of tables (LUT) and change the spatial frequency components with reference to the LUT. Further, it may also be possible to use an LUT based on blue noise instead of the above-mentioned LUT and change the spatial frequency components by adding blue noise to the whole one block.

Moreover, in the modification section 4 of the above-mentioned example, although the DCT coefficients Qk (S, T) in the modification region are changed to −1, 0 or 1, the modification process is not limited to this and, for example, the DCT coefficients Qk (S, T) may be changed to −1 or 0. Further, for example, it may be possible to change the DCT coefficients Qlc (S, T) of the cyan component to −1 or 0 and change the DCT coefficients Qlm (S, T) of the magenta component to 1 or 0, and it may also be possible to use other combinations of numerals. Note that, as illustrated in the above-mentioned example, the modification process in which the DCT coefficients Qk (S, T) are changed to −1, 0 or 1 is more preferred.

The image processor (grayscale reproduction processor) 17 with the above-described structure is applicable to electrophotographic type image forming apparatuses, using a toner. Moreover, the image processor 17 can also be applied to ink-jet type image forming apparatuses using an ink. Here, in order to avoid complicated explanation, the explanation of ink-jet type image forming apparatuses is omitted, and only the advantageous effects are explained. As described above, it is apparent that a dot-off-dot image can be easily formed by performing the modification process of changing the respective color components to different modification values in the modification section 4, and therefore explanation of this effect is also omitted.

Here, in an ink-jet type image forming apparatus, on the contrary to an electrophotographic type image forming apparatus, there may be a possibility that forming a dot-off-dot image in which overlapping of dots rarely occurs is not preferred, but forming a dot-on-dot image in which dots overlap each other is preferred. The reason for this is explained below.

Figure 26B:
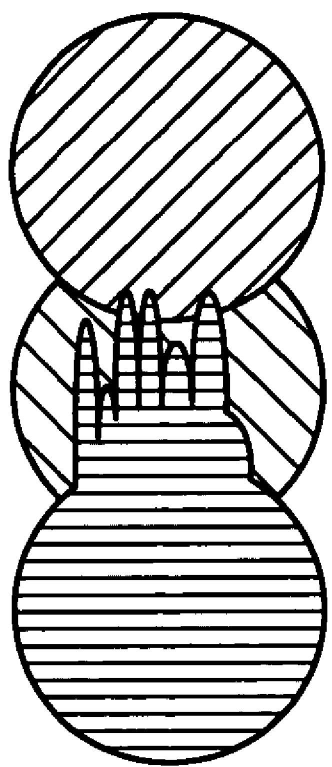
FIGS. 26A and 26B are views showing examples of dot patterns to be formed.
Figure 26A:
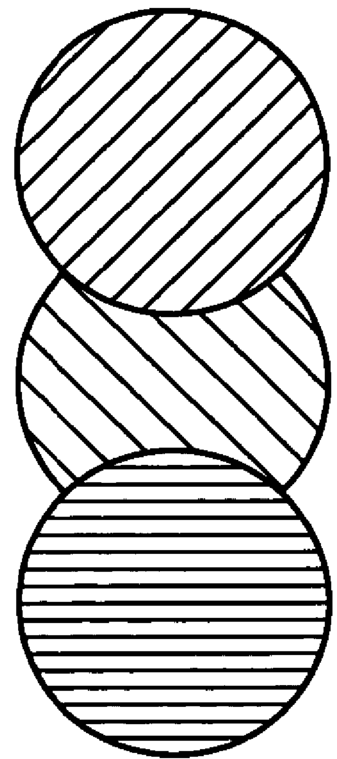

FIGS. 26A and 26B show an example of dot patterns formed by an ink-jet type image forming apparatus, and linearly arranged dot patterns are illustrated for the sake of simplifying the explanation. One circle with hatching represents one dot, and dot patterns in which black, yellow, and magenta dots are formed in this order from the left, for example, are shown in FIGS. 26A and 26B. In the case where dots are formed in the order of black, yellow and magenta in such a manner, as shown in FIG. 26B, the black ink forming the black dot sometimes flows over the yellow dot and reaches the magenta dot due to the yellow dot adjacent to the black dot, and causes a turbid image as a whole and degrades the image quality.

Thus, in the image forming apparatus 17, by changing the DCT coefficients Qky (S, T) of the Y component and the DCT coefficients Qkm (S, T) of the M component to the same frequency component in the modification section 4 and intentionally forming a dot-on-dot image in which the dot of the Y component and the dot of the M component overlap, it is possible to overlap the yellow ink and magenta ink and form a R (red) pixel, while it is possible to prevent the black ink from running via the yellow ink by not forming a yellow dot adjacent to the black ink.

As described above, for color components between which overlapping of dots should be avoided, by changing the DCT coefficients to different modification values in the modification section 4, and, for color components between which overlapping of dots is desired, by changing the DCT coefficients to the same modification value in the modification section 4, even when an ink-jet image forming apparatus is used, it is not necessary to perform the process of controlling the printing order of inks or printing speed, etc, and it is possible to readily generate image data capable of preventing deterioration of image quality without the necessity of determining overlapping of dots in each plane.

Embodiment 9

FIG. 27 is a block diagram showing an example of the structure of an image forming apparatus 70 of the present invention. In this explanation, the image forming apparatus 70 operates as a digital color copying machine. The image forming apparatus 70 comprises a color image input device 30, a color image processing device 31, a color image output device 32, and an operating panel 33. Moreover, although not shown in the drawing, the image forming apparatus 70 comprises a CPU (Central Processing Unit) for controlling the respective devices in the image forming apparatus 70.

The color image input device 30 comprises a CCD (Charge Coupled Device), for example, and the CCD reads a reflected light image from a document and generates RGB analog signals (R: red, G: green, B: blue). The generated RGB analog signals are sent to the color image processing device 31.

The color image processing device 31 comprises an A/D (analog/digital) converting section 311, a shading correcting section 312, an input grayscale correcting section 313, a segmenting section 314, a color correcting section 315, a black generating base color removing section 316, a spatial filtering section 317, an output grayscale correcting section 318, a grayscale reproducing section 319, and a control section (not shown) for controlling the respective sections. The grayscale reproducing section 319 performs the same process as the above-described grayscale reproduction processors (image processors) 10 to 17 of Embodiments 1 through 8.

The color image processing device 31 converts RGB analog signals received from the color image input device 30 into RGB digital signals, performs various image processing such as correction processing, generates CMYK digital color signals, and reduces the number of gray levels of the generated CMYK digital signals to two levels, four levels or other levels. The output image data of two levels, four levels or other levels is temporarily stored in storage means (not shown), and outputted to the color image output device 32 at a predetermined timing.

The A/D converting section 311 receives the RGB analog signals from the color image input device 30, converts the received RGB analog signals into RGB digital signals, and sends the RGB digital signals to the shading correcting section 312. The shading collecting section 312 performs the process of removing various distortions caused in the illumination system, image forming system and image pickup system of the color image input device 30 for the RGB digital signals received from the A/D converting section 311, and then sends the resulting signals to the input grayscale correcting section 313. The input grayscale correcting section 313 adjusts the color balance of the RGB digital signals (reflectance signals of RGB) received from the shading correcting section 312, converts the RGB digital signals into density signals or the like which are readily processed by an image processing system employed in the color image processing device 31, and sends the resulting signals to the segmenting section 314.

The segmenting section 314 classifies each of the pixels within the image of the RGB digital signals received from the input grayscale correcting section 313 as being in a text region, a halftone-dot region, or a picture region, and outputs a region identification signal indicating a region to which each pixel belongs to the color correcting section 315, black generating base color removing section 316, spatial filtering section 317 and grayscale reproducing section 319, based on the result of classification. Besides, the RGB signals received from the input grayscale correcting section 313 are sent to the color correcting section 315 as they are.

The color collecting section 315 converts the RGB digital signals sent from the input grayscale correcting section 313 into CMY signals to faithfully reproduce the color, performs the process of removing color turbidity based on the spectral characteristics of the CMY color material containing undesired absorbent components, and then sends the resulting signals to the black generating base color removing section 316. The black generating base color removing section 316 performs black generation for generating a black signal (K signal) from the three color signals (C signal, M signal, Y signal) of the CYM signals received from the color correcting section 315, generates new CMY signals by removing the K signal obtained by black generation from the original CMY signals, and then sends four color signals of CMYK (CMYK signals) to the spatial filtering section 317.

As a typical black generation process, there is a method for generating black by Skelton black. In this method, if the input/output characteristics of the Skelton curve is y=f(x), the input data are C, M and Y, the output data are C', M', Y' and K', and the UCR (Under Color Removal) ratio is $\alpha$ ($0<\alpha<1$), then the following relations are expressed.

$$K'=f\{\min(C, M, Y)\}$$

$$C'=C-\alpha K'$$

$$M'=M-\alpha K'$$

$$Y'=Y-\alpha K'$$

The spatial filtering section 317 performs spatial filtering on the image of the CMYK signals received from the black generating base color removing section 316 by using a digital filter based on the region identification signal, and performs the process of reducing the deterioration such as blur or graininess of the image by correcting the spatial frequency characteristics. The output grayscale correcting section 318 performs an output grayscale correction, and the grayscale reproducing section 319 executes predetermined processing on the image data of the CMYK signals based on the region identification signal.

For example, for a region classified as text by the segmenting section 314, in order to increase the reproducibility of especially black characters or color characters, the enhancement rate for high frequencies is increased by a sharpness enhancement process included in the spatial filtering process performed by the spatial filtering section 317. In addition, the grayscale reproducing section 319 executes high resolution binarization or multi-valuing processing suitable for reproduction of high frequencies.

For a region classified as halftone dots by the segmenting section 314, the spatial filtering section 317 performs a low-pass filtering process for removing the input halftone components. Then, the output grayscale correcting section 318 performs an output grayscale correction process for converting a signal such as a density signal into a halftone-dot area ratio that is a characteristic value of the color image output device 32, and finally the grayscale reproducing section 319 performs a grayscale reproduction process (halftone generation process) in which the image is divided into pixels and binarization or multi-valuing processing is performed to reproduce the respective gray levels. Further, for a region classified as a picture by the segmenting section 314, the grayscale reproducing section 319 executes binarization or multi-valuing processing by attaching greater importance to grayscale reproducibility.

The CMYK signals (image data) on which the binarization or multi-valuing process is performed in the grayscale reproducing section 319 are sent to the color image output device 32. The color image output device 32 is a device for forming an image on a recording medium such as paper, based on the CMYK signals received from the color image processing device 31. For example, it is possible to use an electrophotographic type or ink-jet type color image output device.

The operating panel 33 is input means for allowing an operator to input instructions by operating keys. The instruction of the operator is outputted as a control signal from the operating panel 33 to the color image input device 30, color image processing device 31 and color image output device 32. According to the instruction of the operator, the document image is read by the color image input device 30, and an image is formed on a recording medium by the color image output device 32 after data processing in the color image processing device 31, and thus these devices function as a digital color copying machine. The above-mentioned processes are controlled by the CPU (not shown).

Embodiment 10

Figure 28:
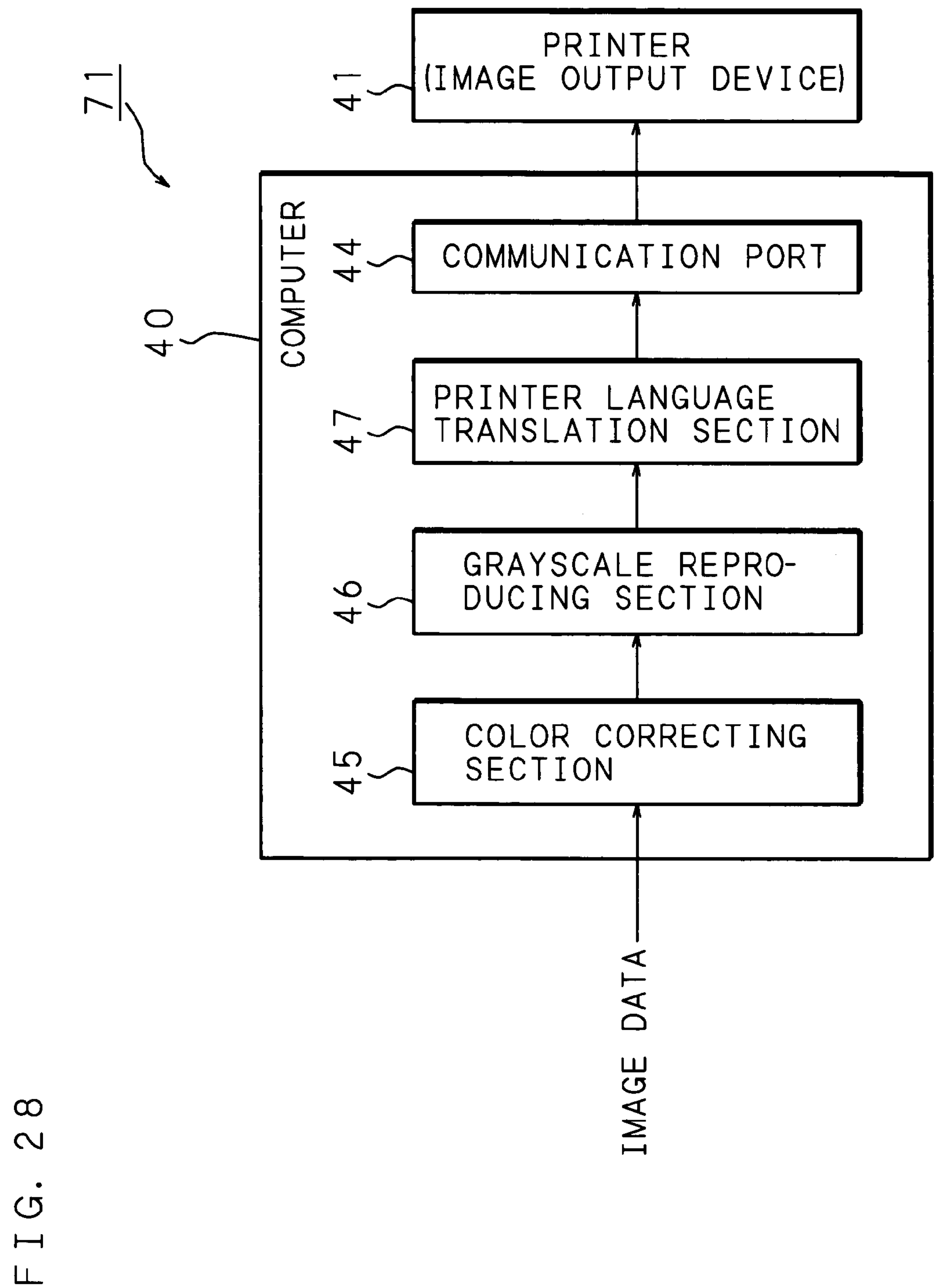
FIG. 28 is a block diagram showing an example of the structure of an image forming system of the present invention.

FIG. 28 is a block diagram showing an example of the structure of an image forming system 71 of the present invention. The image forming system 71 comprises a computer 40, and a printer 41. The printer 41 may be a digital multifunction machine performing the copying function and facsimile function in addition to the printer function. The printer 41 performs electrophotographic type or ink-jet type image formation.

Image data is inputted to the computer 40 from a scanner or a digital camera, for example, and stored in a storage device (not shown). The image data inputted in the computer 40 can be processed and edited by executing various application programs. The computer 40 operates as a color correcting section 45 for collecting the color of output image data, a grayscale reproducing section 46 for performing a thresholding process to reduce the number of gray levels (for example, 256 gray levels) of the output image data to two levels, four levels or other levels, and a printer language translation section 47 for converting the output image data into a printer language. In the color correcting section 45, a black generating base color removing process is also performed. The grayscale reproducing section 46 is equivalent to the above-described grayscale reproducing processors (image processors) 10 to 17 of Embodiments 1 through 8. The data converted into the printer language in the printer language translation section 47 is outputted to the printer 41 through a communication port 44 (RS232C, LAN, etc.).

Figure 29:
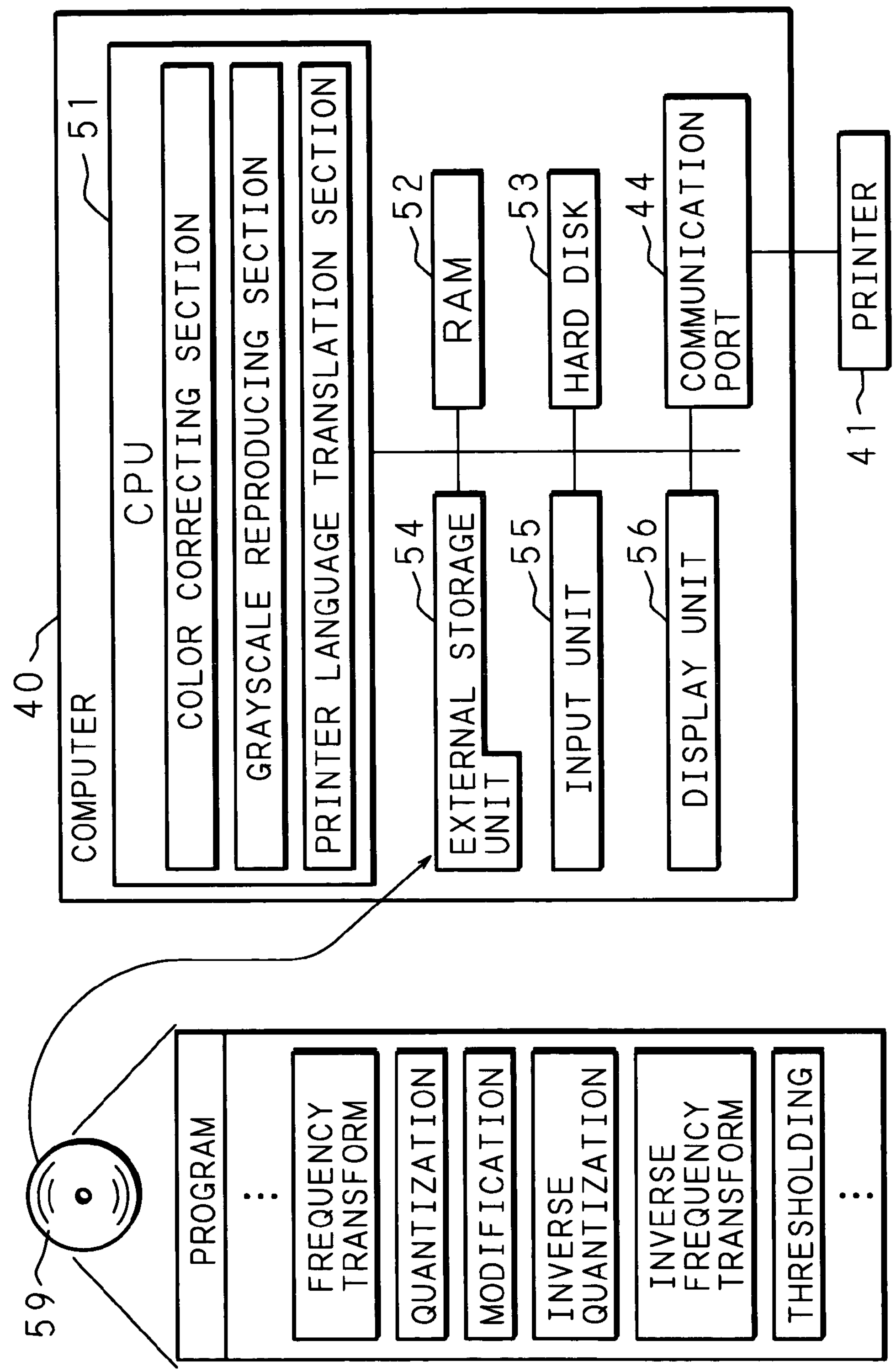
FIG. 29 is a block diagram showing an example of the structure of a computer.

FIG. 29 is a block diagram showing an example of the structure of a computer. The computer 40 comprises a CPU (Central Processing Unit) 51, a RAM (Random Access Memory) 52 such as a DRAM, a hard disk drive (hereinafter referred to as the hard disk) 53, an external storage unit 54 such as a flexible disk drive or a CD-ROM drive, and a communication port 44 for controlling communications with the printer 41, etc. Moreover, the computer 40 comprises an input unit 55 such as a keyboard or a mouse; and a display unit 56 such as a display device.

The CPU 51 controls the above-mentioned respective units 52 to 56 and 44. Besides, the CPU 51 stores a program or data received from the input unit 55 or the communication port 44, or a program or data read from the hard disk 53 or the external storage unit 54 in the RAM 52, performs various processing such as execution of the program or computation of the data stored in the RAM 52, and stores the results of various processing or temporary data used for various processing in the RAM 52. The data such as the computation results stored in the RAM 52 is stored in the hard disk 53, or outputted from the display unit 56 or the communication port 44 by the CPU 51.

The CPU 51 operates as the above-described color correcting section 45, grayscale reproducing section 46 (including the frequency transform section 2, quantization section 3, modification section 4, inverse quantization section 5, inverse frequency transform section 6, and thresholding section 66 shown in FIG. 3, for example), and printer language translation section 47. The hard disk 53 operates as the image data storage section 1 for storing image data.

The CPU 51 can operate as the above-mentioned respective units by reading a computer program recorded in a memory product 59 such as a CD-ROM with the external storage unit 54, storing the computer program in the hard disk 53 or RAM 52, and executing the program with the CPU 51. It is also possible to receive a computer program from other device through the communication port 44 connected to a LAN, etc., and store the computer program in the hard disk 53 or RAM 52.

The memory product 59 may be any storage medium that can carry a program and is readable directly or indirectly by a computer. For example, the memory product 59 may be a semiconductor device such as a ROM or a flash memory; a magnetic storage medium such as a flexible disk, a hard disk, an MD or a magnetic tape; or an optical storage medium such as a CD-ROM, an MO or a DVD, and the recording system and reading system are not particularly limited.

Figure 30:
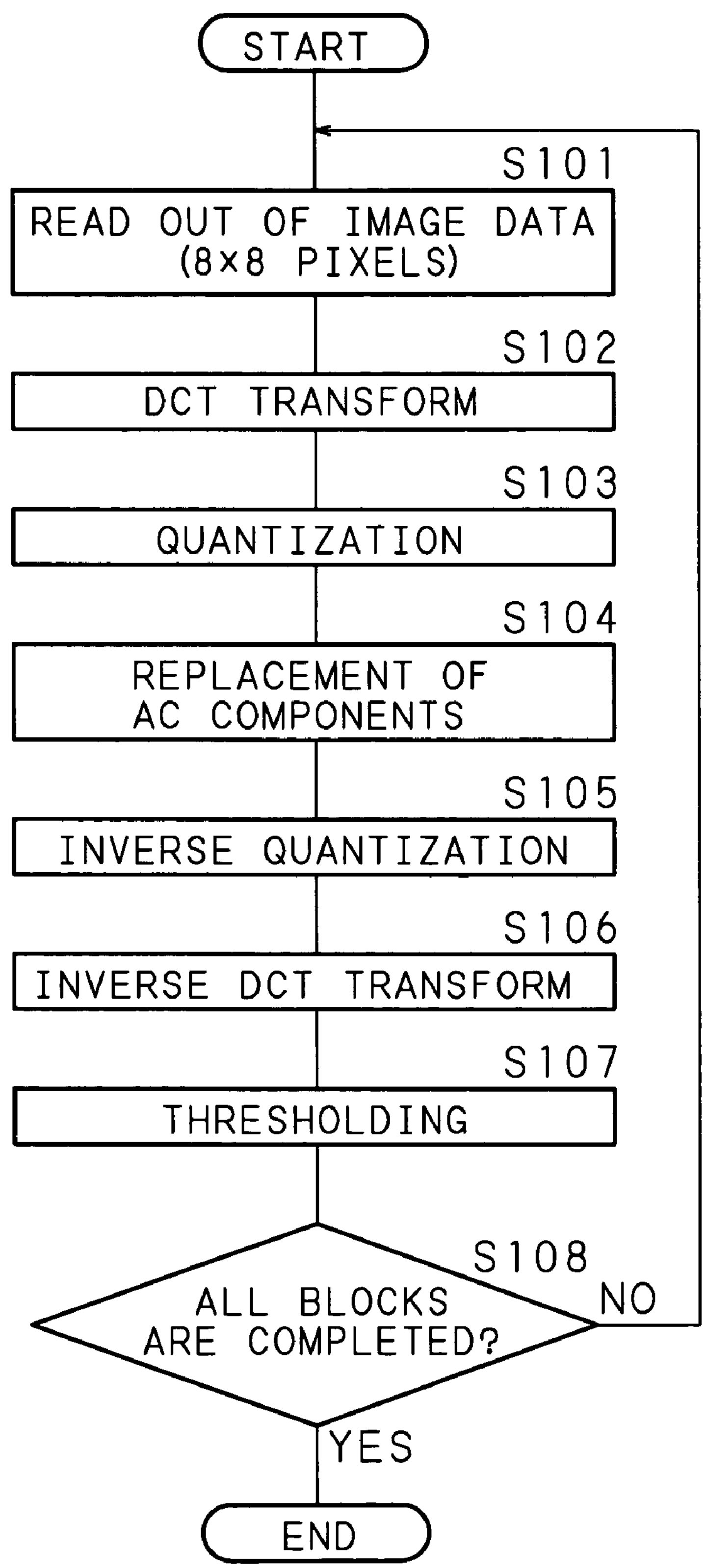
FIG. 30 is a flowchart showing an example of the procedure of grayscale reproduction process.

FIG. 30 is a flowchart showing an example of the grayscale reproduction procedure. Here, an explanation is given for the formation of a quaternary output image by performing a frequency transform process by DCT. Suppose that the input image data Pi (X, Y) is stored in the hard disk 53. The CPU 51 successively reads the image data stored in the hard disk 53 into the RAM 52 by treating 8×8 pixels as one block (S101). Next, the CPU 51 performs a DCT transform of the read image data (S102), and stores the DCT coefficients Qj (S, T) after the DCT transform process in the RAM 52. Then, the CPU 51 performs quantization by dividing all DCT coefficients within a block by a fixed value (for example, 64) (S103), and stores the DCT coefficients Qk (S, T) after the division in the RAM 52.

The CPU 51 replaces (changes) the DCT coefficients (AC components) in the modification region among the quantized (divided) DCT coefficients with 0,1 or −1 (S104), and stores the DCT coefficients Ql (S, T) after the change in the RAM 52. Changing of the DCT coefficients can be performed in the same manner as in the above-described embodiments, and, for example, it is possible to store LUTs in the hard disk 53, read an LUT corresponding to the DC component by the CPU 51, and change the DCT coefficients by using the read LUT. Alternatively, changing can be implemented by replacing the DCT coefficients based on an LUT, or adding the values in the LUT to the DCT coefficients.

The CPU 51 performs inverse quantization by multiplying all DCT coefficients Ql (S, T) within the block after the change by 64, for example, (S105), and stores the resulting DCT coefficients in the RAM 52. Moreover, the CPU 51 performs an inverse DCT transform of the quantized DCT coefficients Qm (S, T) from frequency domain data into density domain data (image data) (S106), and stores the image data Pn (X, Y) obtained by the inverse DCT transform in the RAM 52. Further, the CPU 51 performs a thresholding process of converting the image data Pn (X, Y) after the inverse DCT transform process into a quaternary image (output image data) Po (X, Y) by using a plurality of threshold values (S107), and stores the quaternary image in the RAM 52 or hard disk 53. By the above-described steps S101 through S107, the thresholding process for one block of image data Pi (X, Y) is completed. Thereafter, the CPU 51 judges whether or not the thresholding process has been completed for all blocks (S108), and, if it is judged that the thresholding process has not yet been completed for all blocks (S108: NO), the CPU 51 repeats the processes of the above-mentioned steps S101 through S107 for all blocks.

On the other hand, if it is judged that the thresholding process has been completed for all blocks (S108: YES), the CPU 51 converts the output image data Po (X, Y) into a printer language and transmits the resulting data to the printer 41 through the communication port 44.

Embodiment 11

In Embodiment 10, it is also possible to perform the grayscale reproduction process by omitting the quantization process (S103) and inverse quantization process (S104). In this case, the CPU 51 of the computer 40 operates as the frequency transform section 2, modification section 44, inverse frequency transform section 6 and thresholding section 66 shown in FIG. 19. Besides, in this case, a program for causing the computer 40 to execute the frequency transform, modification, inverse frequency transform and thresholding processes is stored in the memory product 59.

Figure 31:
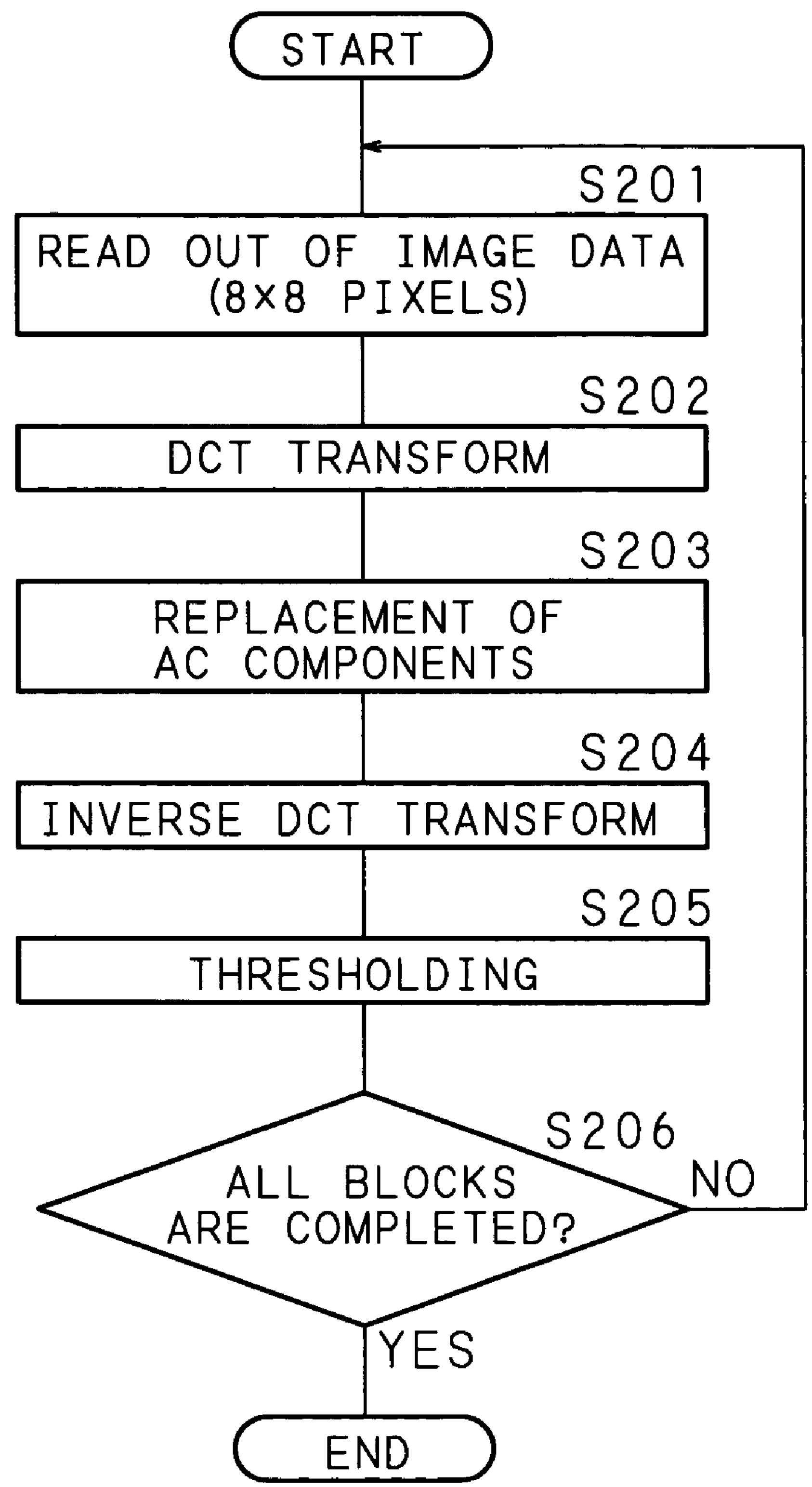
FIG. 31 is a flowchart showing an example of the procedure of grayscale reproduction process.

FIG. 31 is a flowchart showing an example of the grayscale reproduction procedure. Here, an explanation is given for the formation of a quaternary output image by performing the frequency transform process by DCT. Suppose that the input image data Pi (X, Y) is stored in the hard disk 53. The CPU 51 successively reads the image data stored in the hard disk 53 into the RAM 52 by treating 8×8 pixels as one block (S201). Next, the CPU 51 performs a DCT transform of the read image data (S202), and stores the DCT coefficients QJ (S, T) after the DCT transform process in the RAM 52.

The CPU 51 changes (by replacement or addition) the DCT coefficients (AC components) in the modification region among the DCT coefficients Qj to 0, 64 or −64 (S203), and stores the DCT coefficients Qn (S, T) after the change in the RAM 52. Changing of the DCT coefficients can be performed in the same manner as in the above-described embodiments, and, for example, it is possible to store LUTs in the hard disk 53, read an LUT corresponding to the DC component by the CPU 51, and change the DCT coefficients by using the read LUT. Alternatively, it is possible to change the DCT coefficients by replacing them based on the LUT, or add the values in the LUT to the DCT coefficients. Here, the values in the LUT are not 0, 1, or −1, but are 0, 64 or −64, for example.

The CPU 51 performs an inverse DCT transform for the DCT coefficients Qn (S, T) after the change from frequency domain data into density domain data (image data) (S204), and stores the image data Pn1 (X, Y) after the inverse DCT transform process in the RAM 52.

The CPU 51 performs a thresholding process of converting the inverse-frequency-transformed image data Pn1 (X, Y) into a quaternary image (output image data) Po (X, Y) by using a plurality of threshold values (S205), and stores the quaternary image in the RAM 52 or hard disk 53. By the above-described steps S201 through S205, the thresholding process for one block of image data Pi (X, Y) is completed. Thereafter, the CPU 51 repeats the same operations until the thresholding process has been completed for all blocks (S206: NO).

Thus, after transforming the input image data Pi (S, Y) stored in the image data storage section I into the frequency domain and changing a part thereof, the data is subjected to the inverse frequency transform and finally becomes output image data Po (X, Y) in which the number of gray levels of all pixels has been reduced to four levels by the thresholding process. If the thresholding process for all blocks has been completed (S206: YES), the CPU 51 converts the output image data Po (X, Y) into a printer language and transmits the resulting data to the printer 41 through the communication port 44.

In Embodiment 10 described above, although the computer 40 acquires the computer program through the external storage unit 54 from the computer readable memory product in which the computer program is stored, it may also be possible to provide a communication interface connected to an electric communication line and acquire the computer program by downloading it through the electric communication line.

Moreover, in the above-described respective embodiments, although the number of gray levels is reduced to four levels, etc. by a simple thresholding process, it is also possible to use an error diffusion method or a dithering method for thresholding. In this case, high frequency components of the image data are changed and noise is added before performing error diffusion or dithering, and therefore it is possible to reduce occurrence of worms, texture or regular patterns compared to the conventional error diffusion methods or dithering methods. However, although the occurrence of worms or texture is reduced by adding noise, there is a possibility that the image quality may be degraded by noise, and therefore it is preferable to change the high frequency components by using blue noise which is hardly perceived by human eyes.

According to the present invention, by changing the high frequency components of image data, for example, it is possible to solve the problem of tone gap which occurs in the vicinity of output levels of the image data and generate a high-quality binary image or quaternary image. Moreover, by changing high frequency components of image data, for example, it is possible to reduce the texture caused by dithering and worms caused by error diffusion, and it is possible to generate a high-quality binary image, quaternary image, etc.

According to the present invention, since the number of gray levels is reduced simply by comparison with threshold values, it is possible to solve the problems of texture or worms caused in dithering and error diffusion. By solving the problems of texture or worms, it is possible to generate a high-quality binary image, quaternary image, etc.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image processing method comprising the steps of:

receiving image data; and using a processor to perform the following steps of:

transforming image data into spatial frequency components;

quantizing the transformed spatial frequency components;

performing a modification process of changing spatial frequency components in a predetermined frequency domain on the quantized spatial frequency components;

inverse-quantizing the spatial frequency components on which the modification process is performed;

inverse-transforming the inverse-quantized spatial frequency components into image data; and reducing a number of gray levels in the inverse-transformed image data, based on a threshold value.

2. An image processing method comprising the steps of:

receiving image data; and using a processor to perform the following steps of:

transforming image data into spatial frequency components;

performing a modification process of changing spatial frequency components in a predetermined frequency domain on the transformed spatial frequency components;

inverse-transforming the spatial frequency components on which the modification process is performed into image data; and reducing a number of gray levels in the inverse-transformed image data, based on a threshold value.

3. An image processing method comprising the steps of:

receiving image data; and using a processor to perform the following steps of:

transforming image data including a plurality of color components into spatial frequency components;

performing a modification process of changing spatial frequency components in a predetermined frequency domain on the transformed spatial frequency components;

inverse-transforming the spatial frequency components on which the modification process is performed into image data; and reducing a number of gray levels in the inverse-transformed image data, based on a predetermined threshold value, wherein the modification process is performed so that the spatial frequencies of said plurality of color components do not overlap each other.

4. An image processing method comprising the steps of:

receiving image data; and using a processor to perform the following steps of:

transforming image data including a plurality of color components into spatial frequency components;

performing a modification process of changing spatial frequency components in a predetermined frequency domain on the transformed spatial frequency components;

inverse-transforming the spatial frequency components on which the modification process is performed into image data; and reducing a number of gray levels in the inverse-transformed image data, based on a predetermined threshold value, wherein the modification process is performed so that the spatial frequencies of a plurality of predetermined color components overlap each other.

5. An image processor comprising:

a frequency transform section for transforming image data into spatial frequency components;

a quantization section for quantizing the spatial frequency components transformed in said frequency transform section;

a modification section for performing a modification process of changing spatial frequency components in a predetermined frequency domain on the spatial frequency components quantized in said quantization section;

an inverse quantization section for inverse-quantizing the spatial frequency components on which the modification process is performed in said modification section;

an inverse frequency transform section for inverse-transforming the spatial frequency components inverse-quantized in said inverse quantization section into image data; and a thresholding section for reducing a number of gray levels in the image data inverse-transformed in said inverse frequency transform section, based on a threshold value.

6. The image processor of claim 5, wherein said predetermined frequency domain is a high frequency domain in the entire frequency domain of the spatial frequency components.

7. The image processor of claim 5, further comprising:

a detecting section for detecting a direct current component contained in the spatial frequency components; and a determining section for determining the number of changes corresponding to the direct current component detected by said detecting section, wherein said modification section changes a number of spatial frequency components corresponding to the number of changes determined by said determining section.

8. The image processor of claim 5, further comprising a storage section for storing modification values corresponding to the respective spatial frequency components in said predetermined frequency domain, wherein said modification section changes the spatial frequency components in said predetermined frequency domain, based on the corresponding modification values stored in said storage section.

9. The image processor of claim 8, wherein said modification section replaces the spatial frequency components in said predetermined frequency domain with the corresponding modification values.

10. The image processor of claim 8, wherein said modification section adds the corresponding modification values to the spatial frequency components in said predetermined frequency domain.

11. The image processor of claim 8, wherein said modification values are values based on noise data.

12. The image processor of claim 11, wherein said noise data is blue noise data.

13. An image forming apparatus comprising:

an image processor of claim 5; and an image forming section for forming image data having a reduced number of gray levels by reducing the number of gray levels with said image processor.

14. An image processor comprising:

a frequency transform section for transforming image data into spatial frequency components;

a modification section for performing a modification process of changing spatial frequency components in a predetermined frequency domain on the spatial frequency components transformed in said frequency transform section;

a quantization section for quantizing the spatial frequency components on which the modification process is performed in said modification section;

an inverse quantization section for inverse-quantizing the spatial frequency components quantized in said quantization section;

an inverse frequency transform section for inverse-transforming the spatial frequency components inverse-quantized in said inverse quantization section into image data; and a thresholding section for reducing a number of gray levels in the image data inverse-transformed in said inverse frequency transform section, based on a threshold value.

15. An image processor comprising:

a frequency transform section for transforming image data into spatial frequency components;

a modification section for performing a modification process of changing spatial frequency components in a predetermined frequency domain on the spatial frequency components transformed in said frequency transform section;

an inverse frequency transform section for inverse-transforming the spatial frequency components on which the modification process is performed in said modification section into image data; and a thresholding section for reducing a number of gray levels in the image data inverse-transformed in said inverse frequency transform section, based on a threshold value.

16. The image processor of claim 15, wherein said predetermined frequency domain is a high frequency domain in the entire frequency domain of the spatial frequency components.

17. The image processor of claim 15, further comprising:

a detecting section for detecting a direct current component contained in the spatial frequency components; and a determining section for determining the number of changes corresponding to the direct current component detected by said detecting section, wherein said modification section changes a number of spatial frequency components corresponding to the number of changes determined by said determining section.

18. The image processor of claim 15, further comprising a storage section for storing modification values corresponding to the respective spatial frequency components in said predetermined frequency domain, wherein said modification section changes the spatial frequency components in said predetermined frequency domain, based on the corresponding modification values stored in said storage section.

19. The image processor of claim 18, wherein said modification section replaces the spatial frequency components in said predetermined frequency domain with the corresponding modification values.

20. The image processor of claim 18, wherein said modification section adds the corresponding modification values to the spatial frequency components in said predetermined frequency domain.

21. The image processor of claim 18, wherein said modification values are values based on noise data.

22. The image processor of claim 21, wherein said noise data is blue noise data.

23. An image forming apparatus comprising:

an image processor of claim 15; and an image forming section for forming image data having a reduced number of gray levels by reducing the number of gray levels with said image processor.

24. An image processor comprising:

a frequency transform section for transforming image data including a plurality of color components into spatial frequency components;

a modification section for performing a modification process of changing spatial frequency components in a predetermined frequency domain on the spatial frequency components transformed in said frequency transform section;

an inverse frequency transform section for inverse-transforming the spatial frequency components on which the modification process is performed in said modification section into image data; and a thresholding section for reducing a number of gray levels in the image data inverse-transformed in said inverse frequency transform section, based on a predetermined threshold value, wherein said modification section performs the modification process so that the spatial frequency components of said plurality of color components do not overlap each other.

25. The image processor of claim 24, wherein said modification section performs a modification process of changing the frequency components in a high frequency domain in the entire frequency domain of the spatial frequency components of predetermined two color components so that their signs are opposite.

26. The image processor of claim 25, wherein one of said predetermined two color components is black.

27. The image processor of claim 25, wherein said predetermined two color components are cyan and magenta.

28. The image processor of claim 24, further comprising:

a quantization section for quantizing the spatial frequency components transformed in said frequency transform section; and an inverse quantization section for inverse-quantizing the spatial frequency components on which the modification process is performed in said modification section, wherein said modification section changes the spatial frequency components in a predetermined frequency domain of the spatial frequency components quantized in said quantization section, and said inverse frequency transform section inverse-transforms the spatial frequency components inverse-quantized in said inverse quantization section into image data.

29. An image forming apparatus comprising:

an image processor of claim 24; and an image forming section for forming image data having a reduced number of gray levels by reducing the number of gray levels with said image processor.

30. An image processor comprising:

a frequency transform section for transforming image data including a plurality of color components into spatial frequency components;

a modification section for performing a modification process of changing spatial frequency components in a predetermined frequency domain on the spatial frequency components transformed in said frequency transform section;

an inverse frequency transform section for inverse-transforming the spatial frequency components on which the modification process is performed in said modification section into image data; and a thresholding section for reducing a number of gray levels in the image data inverse-transformed in said inverse frequency transform section, based on a predetermined threshold value, wherein said modification section performs the modification process so that the spatial frequency components of a plurality of predetermined color components overlap each other.

31. The image processor of claim 30, wherein said modification section performs a modification process of changing the frequency components in a high frequency domain in the entire frequency domain of the spatial frequency components of a plurality of predetermined color components so that their signs are equal.

32. The image processor of claim 30, further comprising:

a quantization section for quantizing the spatial frequency components transformed in said frequency transform section; and an inverse quantization section for inverse-quantizing the spatial frequency components on which the modification process is performed in said modification section, wherein said modification section changes the spatial frequency components in a predetermined frequency domain of the spatial frequency components quantized in said quantization section, and said inverse frequency transform section inverse-transforms the spatial frequency components inverse-quantized in said inverse quantization section into image data.

33. An image forming apparatus comprising:

an image processor of claim 30; and an image forming section for forming image data having a reduced number of gray levels by reducing the number of gray levels with said image processor.

34. A computer-readable medium storing a computer program, said computer program comprising the steps of:

causing a computer to transform image data into spatial frequency components;

causing the computer to quantize the transformed spatial frequency components;

causing the computer to perform a modification process of changing spatial frequency components in a predetermined frequency domain on the quantized spatial frequency components;

causing the computer to inverse-quantize the spatial frequency components on which the modification process is performed;

causing the computer to inverse-transform the inverse-quantized spatial frequency components into image data; and causing the computer to reduce a number of gray levels in the inverse-transformed image data, based on a threshold value.

35. A computer-readable medium storing a computer program, said computer program comprising the steps of:

causing a computer to transform image data into spatial frequency components;

causing the computer to perform a modification process of changing spatial frequency components in a predetermined frequency domain on the transformed spatial frequency components;

causing the computer to inverse-transform the spatial frequency components on which the modification process is performed into image data; and causing the computer to reduce a number of gray levels in the inverse-transformed image data, based on a threshold value.

36. A computer-readable medium storing a computer program, said computer program comprising the steps of:

causing a computer to transform image data including a plurality of color components into spatial frequency components;

causing the computer to perform a modification process of changing spatial frequency components in a predetermined frequency domain of said plurality of color components on the transformed spatial frequency components so that they do not overlap each other;

causing the computer to inverse-transform the spatial frequency components on which the modification process is performed into image data; and causing the computer to reduce a number of gray levels in the inverse-transformed image data, based on a predetermined threshold value.

37. A computer-readable medium storing a computer program, said computer program comprising the steps of:

causing a computer to transform image data including a plurality of color components into spatial frequency components;

causing the computer to perform a modification process of changing spatial frequency components in a predetermined frequency domain of a plurality of predetermined color components on the transformed spatial frequency components so that they overlap each other;

causing the computer to inverse-transform the spatial frequency components on which the modification process is performed into image data; and causing the computer to reduce a number of gray levels in the inverse-transformed image data, based on a predetermined threshold value.

* * * * *